US008185193B2

(12) United States Patent
Morikawa et al.

(10) Patent No.: US 8,185,193 B2
(45) Date of Patent: May 22, 2012

(54) ELECTROENCEPHALOGRAM INTERFACE SYSTEM AND ACTIVATION APPARATUS

(75) Inventors: Koji Morikawa, Kyoto (JP); Shinobu Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 555 days.

(21) Appl. No.: 12/374,879

(22) PCT Filed: Jun. 10, 2008

(86) PCT No.: PCT/JP2008/001479
§ 371 (c)(1),
(2), (4) Date: Jan. 23, 2009

(87) PCT Pub. No.: WO2008/152799
PCT Pub. Date: Dec. 18, 2008

(65) Prior Publication Data
US 2009/0187114 A1    Jul. 23, 2009

(30) Foreign Application Priority Data

Jun. 12, 2007   (JP) ................................. 2007-155402

(51) Int. Cl.
*A61B 5/0482* (2006.01)
(52) U.S. Cl. ........................................ 600/544; 600/545
(58) Field of Classification Search ........................ None
See application file for complete search history.

(56) References Cited

U.S. PATENT DOCUMENTS 4,928,704 A * 5/1990 Hardt ............................ 600/545
6,931,274 B2 * 8/2005 Williams ...................... 600/544

FOREIGN PATENT DOCUMENTS

| JP | 11-073286 | * | 3/1999 |
| JP | 11-073286 | | 6/1999 |
| JP | 2000-075991 | | 3/2000 |
| JP | 2004-086768 | * | 3/2004 |
| JP | 2004-275619 | | 10/2004 |

OTHER PUBLICATIONS

International Search Report for corresponding Application No. PCT/JP2008/001479 mailed Jul. 22, 2008.
Donchin et al., "The Mental Prosthesis: Assessing the Speed of a P300-Based-Brain-Computer Interface", IEEE Transactions on Rehabilitation Engineering, vol. 8, No. 2, Jun. 2000, pp. 174-179.
Xiaorong Gao et al., "A BCI-Based Environmental Controller for the Motion-Disabled", IEEE Transactions on Neural Systems and Rehabilitation Engineering, vol. 11, No. 2, Jun. 2003, pp. 137-140.
Form PCT/ISA/237 and a partial English translation.

* cited by examiner

*Primary Examiner* — Michael Borin
(74) *Attorney, Agent, or Firm* — Renner, Otto, Boisselle & Sklar, LLP

(57) ABSTRACT

An electroencephalogram interface system includes a biological signal detection section for detecting an electroencephalogram signal from a user and a control section for distinguishing a component of an event-related potential and causing a device to operate based on the distinguished event-related potential. An activation apparatus activates the control section and an output section for presenting a visual stimulation which flickers with a predetermined frequency based on a signal from the activation apparatus. The activation apparatus includes: a frequency analysis section for analyzing a frequency component of the electroencephalogram signal and detecting an intensity corresponding to the predetermined frequency; and a determination section for comparing the detected intensity of the predetermined frequency and a predetermined threshold, and if the intensity of the predetermined frequency is equal to or greater than a predetermined threshold, activating the control section.

12 Claims, 13 Drawing Sheets

*FIG.6*
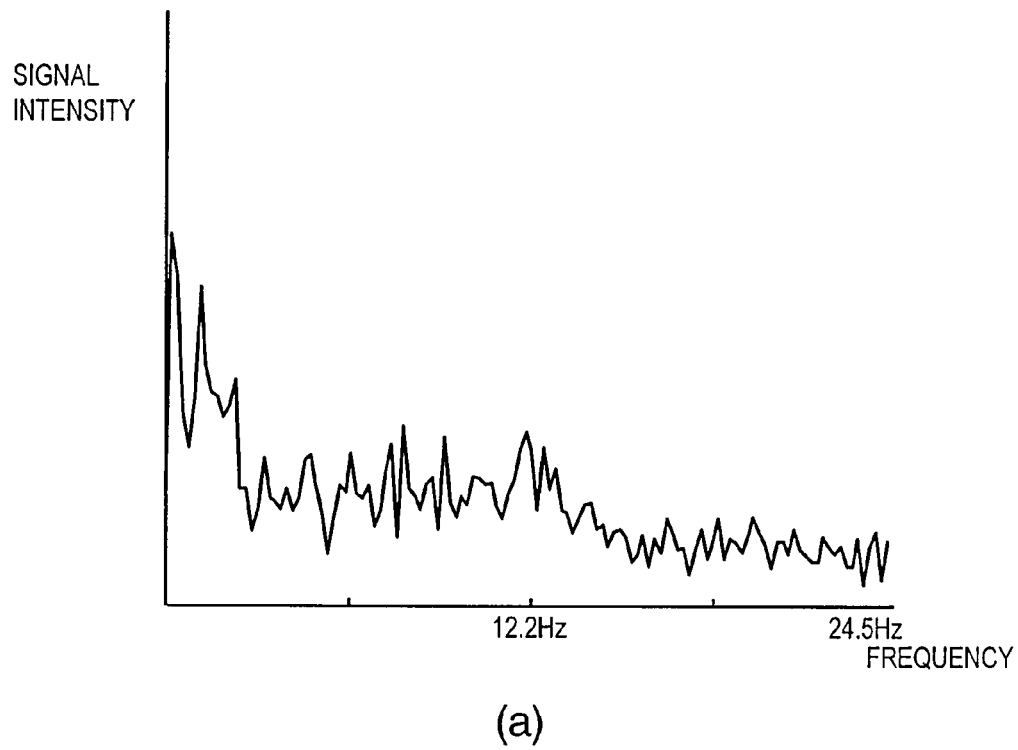
(a)
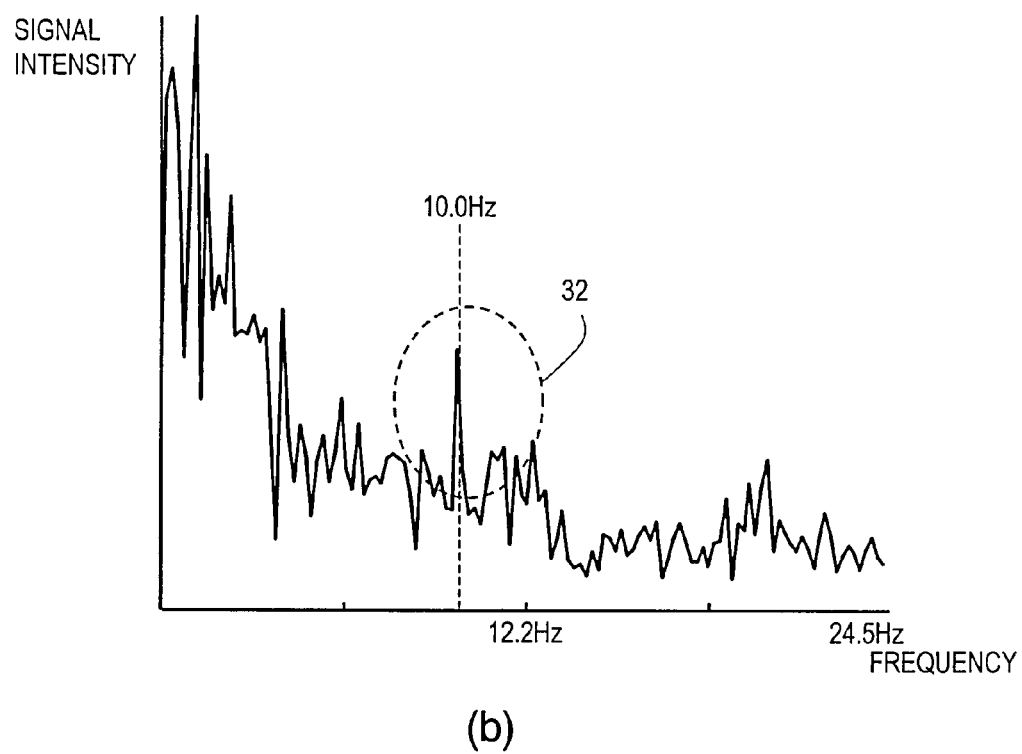
(b)

| DEVICE NAME | DEVICE 1 (TAP) | DEVICE 2 (MICROWAVE OVEN) | ... | DEVICE n (ELECTROMAGNETIC COOKER) |
|---|---|---|---|---|
| SET FLICKER FREQUENCY | 6.0 Hz | 10.0 Hz | | 15.0 Hz |
| DEVICE OPERATION | ON/OFF | DISPLAY MENU | | ON/OFF |

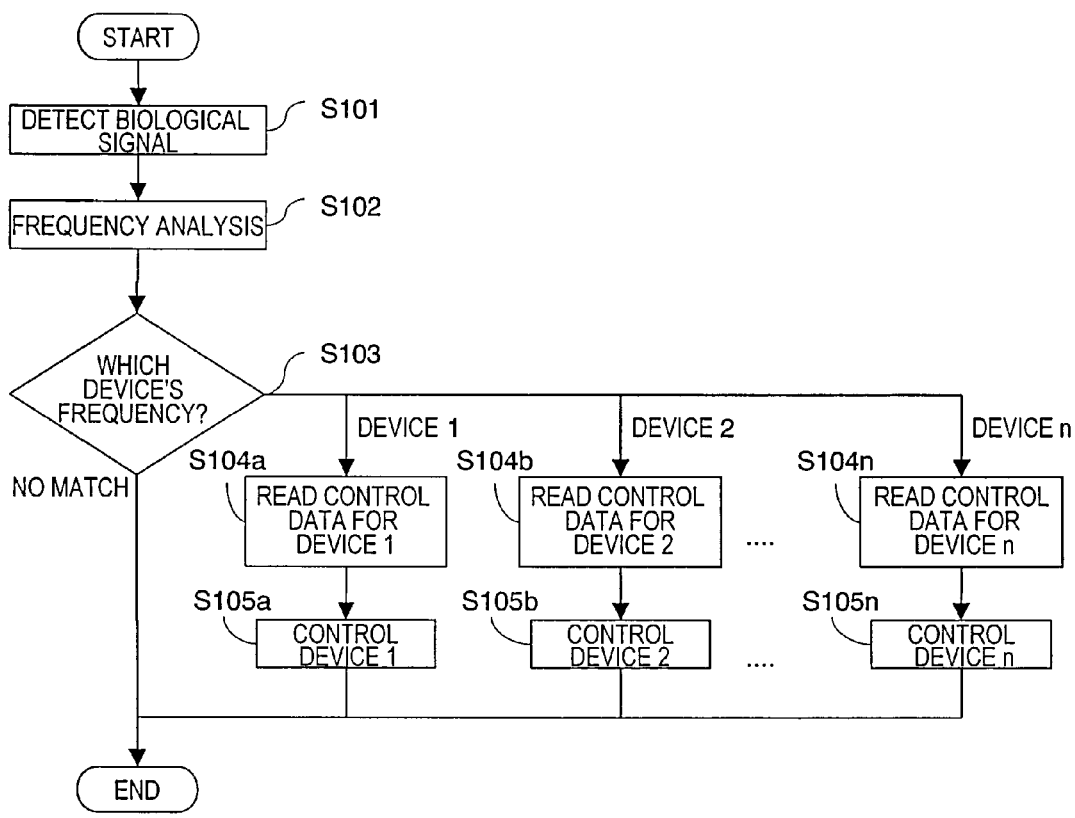

ELECTROENCEPHALOGRAM INTERFACE SYSTEM AND ACTIVATION APPARATUS

RELATED APPLICATION DATA

This non-provisional patent application is filed under 35 U.S.C. §371 based on PCT Application No. PCT/JP2008/001479 filed on Jun. 10, 2008, which claims priority to Japanese Application No. 2007-155402 filed on Jun. 12, 2007, the entire contents of which are hereby incorporated by reference.

TECHNICAL FIELD

The present invention relates to an electroencephalogram interface system for performing device manipulations by using electroencephalograms. More specifically, it relates to an activation apparatus which is incorporated in an electroencephalogram interface system and activates an electroencephalogram interface by utilizing the electroencephalograms of a user, an activation method, and a computer program which is executed on such an activation apparatus.

BACKGROUND ART

To date, various devices have been proposed in our lives. While living among such devices, users enjoy desired information or services by manipulating the devices. Because of an increase in the number of devices themselves, an increase in the information that cannot be obtained without using devices, and so on, the importance of improving the manipulability of such interfaces is increasing year after year. In information devices (television sets, mobile phones, PDAs, etc.), for example, device manipulations are hitherto realized by selecting an manipulation option while watching a screen. As manipulation input means thereof, methods such as pressing a button, moving a cursor and making a confirmation, or manipulating a mouse while watching a screen have been used. However, it has often been impossible to execute a manipulation when both hands are unavailable, due to tasks other than device manipulations, e.g., household chores, rearing of children, and driving an automobile.

In answer thereto, there are input means utilizing biological signals from a user. Non-Patent Document 1 discloses a technique that utilizes an event-related potential of electroencephalograms for distinguishing an option which a user wishes to select. Specifically, options that a user wishes to select are randomly highlighted, and the waveform of an event-related potential which appears about 300 milliseconds after a point in time that an option was highlighted is utilized to enable distinction as to wishing to select or not. According to this technique, even in a situation where both hands are full, or even in a situation where the user is unable to move his or her limbs due to an illness or the like, the user can select an option which they wish to select, whereby an interface for device manipulations, etc., can be realized. Patent Document 1 also describes an example of a electroencephalograms interface which similarly uses an event-related potential.

Non-Patent Document 2 illustrates an application of a steady-state visual evoked potential (SSVEP), among other visual evoked potentials (VEPs). A steady-state visual evoked potential refers to a potential component which is superposed on a electroencephalogram signal when watching a light source that flickers with a constant frequency. It is known that, by subjecting the electroencephalogram signal to a frequency analysis, the same frequency as the flicker frequency of the light source appears in the electroencephalograms. In order to apply this mechanism to an electroencephalogram interface, with respect to a plurality of LEDs flickering at different frequencies, an evoked potential that occurs when a user watches a specific LED is caught in Non-Patent Document 2. With this evoked potential, it is identified that the specific LED has been selected, whereby one option can be selected from among as many options as there are LEDs.

Conventionally, a menu selection based on electroencephalograms has been realized by applying various processing to an electroencephalogram signal.

[Patent Document 1] Japanese Laid-Open Patent Publication No. 2004-275619

[Non-Patent Document 1] Donchin et al., "The Mental Prosthesis: Assessing the Speed of a P300-Based Brain-Computer Interface", TRANSACTIONS ON REHABILITATION ENGINEERING 2000, Vol. 8, No. 2, June 2000

[Non-Patent Document 2] Xiaorong Gao et al., "A BCI-Based Environment Controller for the Motion-Disabled", IEEE Transactions on Neural Systems and Rehabilitation Engineering, Vol. 11, No. 2, June 2003

DISCLOSURE OF INVENTION

Problems to be Solved by the Invention

However, in the aforementioned instances of electroencephalogram interfaces, only manipulations after activation of an electroencephalogram interface are discussed, and there is no discussion of how an electroencephalogram interface is activated. The reason is that, these instances envisage use in a situation where a screen of an electroencephalogram interface (e.g., an option presenting screen) is always displayed.

When an electroencephalogram interface is used for a person in a hospital who is having difficulties with his or her body, for example, a screen of an electroencephalogram interface (e.g., an option presenting screen) is always displayed by the bedside. Therefore, within the scope of conventional usage, whether the electroencephalogram interface is activated or not has not been an issue.

On the other hand, when an electroencephalogram interface is mounted in an information presenting device such as a television set or a mobile phone that is used in daily life, the electroencephalogram interface is used in situations which are quite different from the aforementioned instances. When mounted on an information device in daily life, a screen of the information terminal is occupied with information which is meant to be presented by the natural function of the information terminal, e.g., schedule, main text of mail, or a TV program, and thus it is not possible to always display a screen of an electroencephalogram interface.

It might be possible to provide an activation button for causing a screen of an electroencephalogram interface to be displayed. However, in situations where both hands are full because of tasks other than a device manipulation, e.g. household chores, rearing of children, or driving, it is difficult to use an electroencephalogram interface. In view of the users' need to manipulate an information device in every kind of situation by using an electroencephalogram interface, it is necessary to achieve its activation also by using the electroencephalogram interface.

An objective of the present invention is to activate an electroencephalogram interface by utilizing a biological signal, in particular a steady-state visual evoked potential, from a user.

Means for Solving the Problems

An electroencephalogram interface system according to the present invention comprises: a biological signal detection section for detecting an electroencephalogram signal from a user, and a control section for distinguishing a component of an event-related potential which is contained in the electroencephalogram signal and causing a device to operate based on the distinguished event-related potential, wherein, the electroencephalogram interface system further comprises: an activation apparatus for activating the control section, and an output section for presenting a visual stimulation which flickers with a predetermined frequency based on a signal from the activation apparatus; and the activation apparatus includes: a frequency analysis section for analyzing a frequency component of the electroencephalogram signal detected by the biological signal detection section, and detecting an intensity corresponding to the predetermined frequency; and a determination section for comparing the detected intensity of the predetermined frequency and a predetermined threshold, and if the intensity of the predetermined frequency is equal to or greater than the predetermined threshold, determining that the user has been paying attention to the visual stimulation and thus activating the control section.

In an electroencephalogram interface system having a biological signal detection section for detecting an electroencephalogram signal from a user and a control section for distinguishing a component of an event-related potential which is contained in the electroencephalogram signal and causing a device to operate based on the distinguished event-related potential, an activation apparatus according to the present invention is used for activating the control section, wherein, the electroencephalogram interface system further has an output section for presenting a visual stimulation which flickers with a predetermined frequency based on a signal from the activation apparatus, the activation apparatus comprising: a frequency analysis section for analyzing a frequency component of the electroencephalogram signal detected by the biological signal detection section, and detecting an intensity corresponding to the predetermined frequency; and a determination section for determining whether the user has been paying attention to the visual stimulation or not based on the detected intensity of the predetermined frequency, and activating the control section based on a result of determination.

The determination section may determine whether the user has been paying attention to the visual stimulation or not based on a result of comparison between the intensity of the predetermined frequency and a predetermined threshold.

When the intensity of the predetermined frequency is equal to or greater than the predetermined threshold, the determination section may determine that the user has been paying attention to the visual stimulation and activates the control section.

The activation apparatus may further comprise: a biological signal analysis section for analyzing signal intensities of a plurality of frequencies contained in the electroencephalogram signal detected by the biological signal detection section; a setting section for setting the predetermined frequency based on a result of analysis by the biological signal analysis section; and an adjustment section for generating a signal for presenting the visual stimulation at the frequency having been set.

The biological signal analysis section may continuously analyze the signal intensities of the plurality of frequencies, and set as the predetermined frequency a frequency which is different from a frequency whose signal intensity is increasing.

The output section may output a video content as a result of operation of the device; and the activation apparatus may further comprise: a content analysis section for analyzing signal intensities of a plurality of frequencies contained in the vide content; a setting section for setting the predetermined frequency based on a result of analysis by the content analysis section; and an adjustment section for generating a signal for presenting the visual stimulation at the frequency having been set.

The output section may have a screen for presenting a video content which is output as a result of operation of the device; and the activation apparatus may further comprise: a content analysis section for analyzing signal intensities of a plurality of frequencies contained in the vide content; a biological signal analysis section for analyzing signal intensities of a plurality of frequencies contained in the electroencephalogram signal detected by the biological signal detection section; a setting section A for, among the analyze signal intensities of the respective frequencies, notifying a frequency having a signal intensity which is higher than a predetermined threshold; a setting section B for, based on a result of analysis by the content analysis section, notifying a frequency at which the video content changes; and an adjustment section for setting as the predetermined frequency a frequency which is different from the frequency notified by the setting section A and from the frequency notified by the setting section B.

The output section may have a screen for presenting a video content which is output as a result of operation of the device; and the adjustment section may present the visual stimulation by flickering a portion of the screen at the predetermined frequency.

The output section may include a light source for presenting the visual stimulation and a screen for presenting a video content which is output as a result of operation of the device; and the adjustment section may present the visual stimulation by flickering the light source at the predetermined frequency.

The determination section may activate the control section, and cause the control section to allow the device to operate based on the distinguished event-related potential and causes the adjustment section to stop presenting the visual stimulation.

An electroencephalogram interface system according to the present invention detects an electroencephalogram signal from a user and controls an operation of at least one device based on the electroencephalogram signal, comprising: a biological signal detection section for detecting an electroencephalogram signal from a user; an output section being provided corresponding to the at least one device and having a light source for presenting a visual stimulation; and an activation apparatus for controlling activation of the at least one device and stopping of an operation thereof, wherein the activation apparatus includes: a frequency analysis section for analyzing a frequency component of the electroencephalogram signal detected by the biological signal detection section, and detecting an intensity corresponding to the predetermined frequency, and a determination section for determining whether the user has been paying attention to the visual stimulation or not based on the detected intensity of the predetermined frequency, and activating the at least one device or stopping an operation thereof based on a result of determination.

A method according to the present invention is a method to be used in an electroencephalogram interface system for controlling a device based on an electroencephalogram signal from a user, comprising the steps of: presenting a visual stimulation flickering with a predetermined frequency; detecting an electroencephalogram signal from a user; analyzing a frequency component of the detected electroencephalogram signal, and detecting an intensity corresponding to the predetermined frequency; comparing the detected intensity of the predetermined frequency and a predetermined threshold; and activating the device if the intensity of the predetermined frequency is equal to or greater than a predetermined threshold.

In an electroencephalogram interface system having a biological signal detection section for detecting an electroencephalogram signal from a user and a control section for distinguishing a component of an event-related potential which is contained in the electroencephalogram signal and causing a device to operate based on the distinguished event-related potential, a computer program according to the present invention is executed in an activation apparatus used for activating the control section, wherein, the electroencephalogram interface system further includes an output section for presenting a visual stimulation which flickers with a predetermined frequency based on a signal from the activation apparatus, the computer program comprising the steps of: analyzing a frequency component of the electroencephalogram signal detected by the biological signal detection section, and detecting an intensity corresponding to the predetermined frequency; and determining whether the user has been paying attention to the visual stimulation or not based on the detected intensity of the predetermined frequency, and activating the control section based on a result of determination.

EFFECTS OF THE INVENTION

In accordance with an electroencephalogram interface system of the present invention, electroencephalograms are observed even while an electroencephalogram interface is not being used, and it is determined whether a steady-state visual evoked potential corresponding to a flicker frequency of a visual stimulation for activation of the electroencephalogram interface (e.g., an icon on a screen or an LED) is appearing on the electroencephalograms or not. If a steady-state visual evoked potential is appearing on the electroencephalograms, the electroencephalogram interface is activated. As a result, at every phase such as activation of the electroencephalogram interface, selection and confirmation of a menu after activation of the electroencephalogram interface, and so on, manipulations via the electroencephalogram interface are possible by utilizing the electroencephalograms of the user. This makes it possible to execute a function based only on electroencephalograms, even in an information device or the like whose screen is occupied at usual times.

BRIEF DESCRIPTION OF DRAWINGS

FIG. 6 (a) is a diagram showing an electroencephalograms frequency distribution of the user 3 when not looking at flickering of an icon, and (b) is a diagram showing an electroencephalograms frequency distribution of the user 3 when looking at flicker of an icon.

FIG. 18 A flowchart showing a processing procedure by the activation apparatus 42 according to Embodiment 4.

Figure 1:
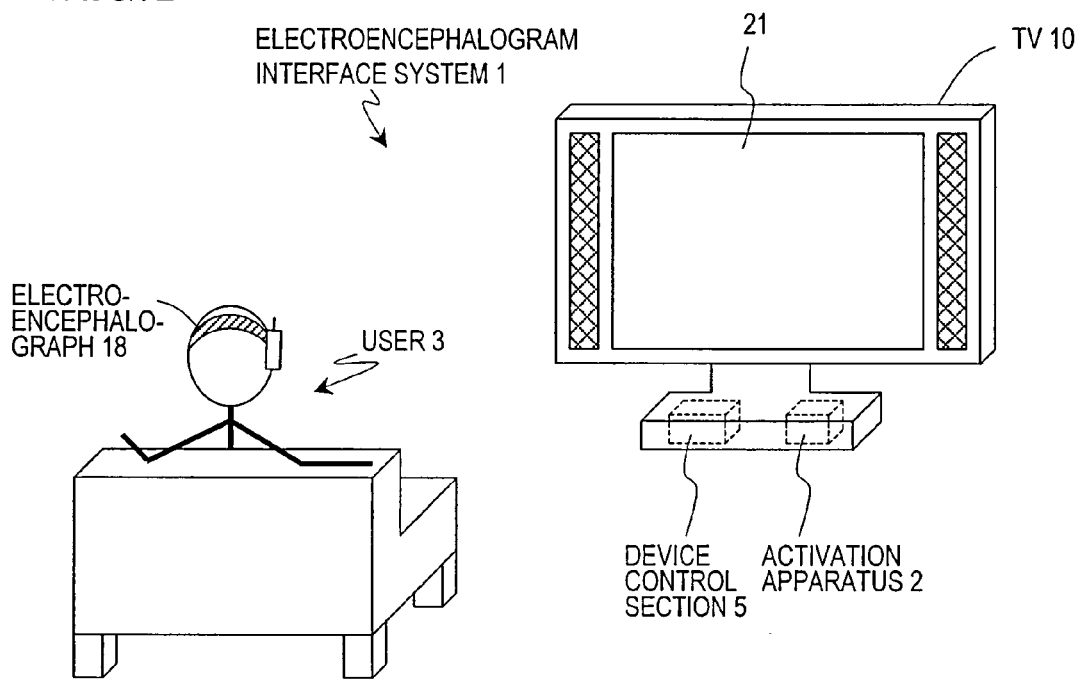
FIG. 1 A diagram showing a construction and an environment of use for an electroencephalogram interface system 1 according to Embodiment 1.

DESCRIPTION OF THE REFERENCE NUMERALS 1, 11, 101 electroencephalogram interface system
2, 12, 42, 102 activation apparatus
2a, 5a CPU
2b, 5b RAM
2c, 5c ROM
2d, 5d computer program
3 user
4 biological signal detection section
5 device control section
5e image processing circuit
7 frequency analysis section
8 activation determination section
9, 17 frequency adjustment section
10 TV
13 biological signal analysis section
14 frequency setting section (A)
15 content analysis section
16 frequency setting section (B)
18 electroencephalograph
19 bus

BEST MODE FOR CARRYING OUT THE INVENTION

Hereinafter, with reference to the attached drawings, embodiments of the electroencephalogram interface system according to the present invention will be described.

(Embodiment 1)

Hereinafter, an electroencephalogram interface system according to the present embodiment will be first described, followed by a description of the construction and operation of an activation apparatus for activating an electroencephalogram interface.

FIG. 1 shows a construction and an environment of use for the electroencephalogram interface system 1 of the present embodiment. The electroencephalogram interface system 1 is exemplified so as to correspond to the system construction of Embodiment 1 described later.

The electroencephalogram interface system 1 is used for providing an interface for manipulating a TV 10 by utilizing an electroencephalogram signal from the user 3. An electroencephalogram signal from the user 3 is acquired by an electroencephalograph 18 which is worn on the head of the user 3, and transmitted to a device control section 5 in a wireless or wired manner. The device control section 5 internalized in the TV 10 recognizes an intent of the user 3 by utilizing a component called an event-related potential, which constitutes a part of the electroencephalograms, and from among a plurality of selection items displayed on a screen 21 of the TV 10, selects a menu desired by the user 3, and performs processing such as switching of received channels based on the result of selection. Such a user interface is referred to as a "electroencephalogram interface".

As used herein, an "event-related potential" refers to a transient potential fluctuation in the brain which occurs in temporal relationship with an external or internal event. An electroencephalogram interface utilizes an event-related potential which is obtained from a stimulation to the visual sense as an external event. For example, within the event-related potential for a visual stimulation, a so-called P3 component may be utilized to perform processing such as switching of channels, selection of a program genre of which viewing is desired, and sound volume level adjustment. The "P3 component" refers to a positive component of the event-related potential which appears in a time slot of 250 ms to 500 ms after a target stimulation is presented, regardless of the type of sensory stimulation such as auditory sense, visual sense, or somatic sensation.

In the present embodiment, whether or not the user 3 uses an electroencephalogram interface, i.e., whether or not the user 3 allows a user interface function of the device control section 5 to operate is determined by the activation apparatus 2 by utilizing the electroencephalograms of the user 3. The activation apparatus 2 also constitutes a portion of the electroencephalogram interface system 1. The specific operation of the activation apparatus 2 will be described later. In the present specification, when the device control section 5 executes a user interface function, the device control section 5 is said to be activated.

Figure 2:
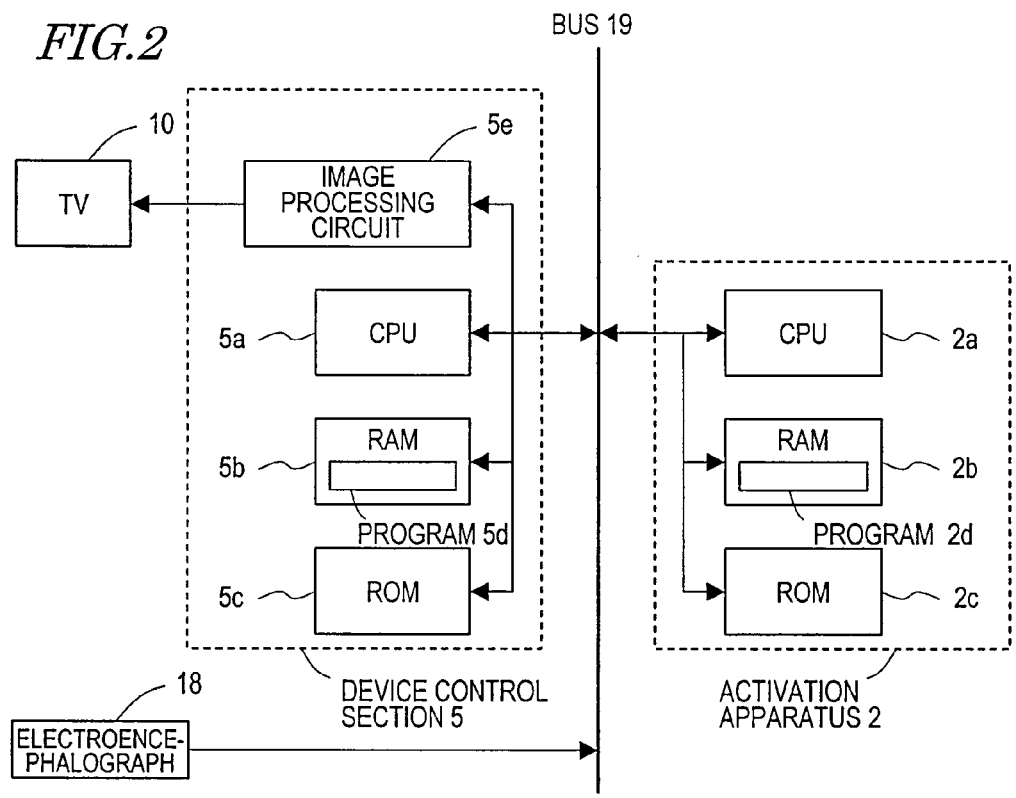
FIG. 2 A hardware construction diagram of the electroencephalogram interface system 1 according to Embodiment 1.

FIG. 2 is a hardware construction diagram of the electroencephalogram interface system 1 of the present embodiment. The electroencephalogram interface system 1 includes the activation apparatus 2, the device control section 5, the TV 10, and the electroencephalograph 18. The activation apparatus 2, the device control section 5, and the electroencephalograph 18 are connected to a bus 19, so that exchanges of signals between component elements are performed via the bus 19. When the device control section 5 executes an electroencephalogram interface function based on an electroencephalogram signal from the user 3 (i.e., when the device control section 5 is activated), an instruction which is generated as a result thereof is sent to the TV 10, and the TV 10 operates.

Note that, although the device control section 5 is illustrated as being internalized in the TV 10, the device control section 5 does not need to be internalized in the TV 10 in terms of its relationship with the electroencephalogram interface function. Therefore, in FIG. 2, the activation apparatus 2 and the TV 10 are described as independent constituents. Moreover, in the case where the electroencephalograph 18 transmits an electroencephalogram signal from the user 3 wirelessly, the electroencephalograph 18 will include a wireless transmission section, and a wireless reception section will be connected to the bus 19.

The activation apparatus 2 includes a CPU 2a, a RAM 2b, and a ROM 2c. The CPU 2a loads a computer program 2d which is stored in the ROM 2c onto the RAM 2b, and lays it out on the RAM 2b and executes it. In accordance with the computer program 2d, the activation apparatus 2 performs a process of determining the necessity to activate a subsequently-described electroencephalogram interface. Note that the ROM 2c may be a rewritable ROM (e.g. EEPROM).

The device control section 5 includes a CPU 5a, a RAM 5b, and a ROM 5c. The respective functions of the CPU 5a, the RAM 5b, and the ROM 5c are similar to those of their namesake component elements in the activation apparatus 2. A computer program 5d which is stored on the ROM 5c is intended for processes for realizing an electroencephalogram interface function, whereby the activation apparatus 2 and the device control section 5 have different functions. Note that a common CPU, RAM, and ROM may be shared between the activation apparatus 2 and the device control section 5, and only separate computer programs may be provided, thus simplifying the construction.

The device control section 5 further includes an image processing circuit 5e. In accordance with an instruction from the CPU 5a, the image processing circuit 5e outputs a video signal for causing an icon for electroencephalogram interface activation to flicker on the screen of the TV 10.

The aforementioned computer programs are distributed on the market in the form of products recorded on a storage medium such as a CD-ROM, or transmitted via telecommunication lines such as the Internet. Note that the activation apparatus 2 and the device control section 5 can also be implemented in hardware, as computer programs incorporated in semiconductor circuitry, e.g., DSPs. FIGS. 3(a) to (d) show examples where the user 3 watches a program of a genre which he or she wishes to view by manipulating the TV 10 in the electroencephalogram interface system 1.

In FIG. 3(a), a menu icon 22 which flickers with a predetermined frequency is shown on the screen 21. If the activation apparatus 2 determines that the user 3 is looking at the menu icon 22, the device control section 5 is activated, whereby the electroencephalogram interface becomes usable. At the same time, a menu item screen of FIG. 3(b) is displayed.

FIG. 3(b) is an example of a menu which the device control section 5 presents to the user 3 via the screen 21 of the TV. On the screen, a question 24 "Which program do you want to watch?" and options that are candidates of programs whose watching may be desired are displayed. Herein, four options are displayed, i.e., "baseball" 25a, "weather forecast" 25b, "cartoon show" 25c, and "news" 25d.

In the example of FIG. 3(b), baseball 25a which is at the topmost is first selected and receives highlight indication. "Highlight indication" means an indication against a brighter background or indication in a brighter text color than other items, or an indication pointed to by a cursor or the like. Herein, it suffices if it is clear which item the system currently wants attention to, when looked at by the user 3. Next to the fourth "news" 25*d*, it returns to baseball.

Figure 3:
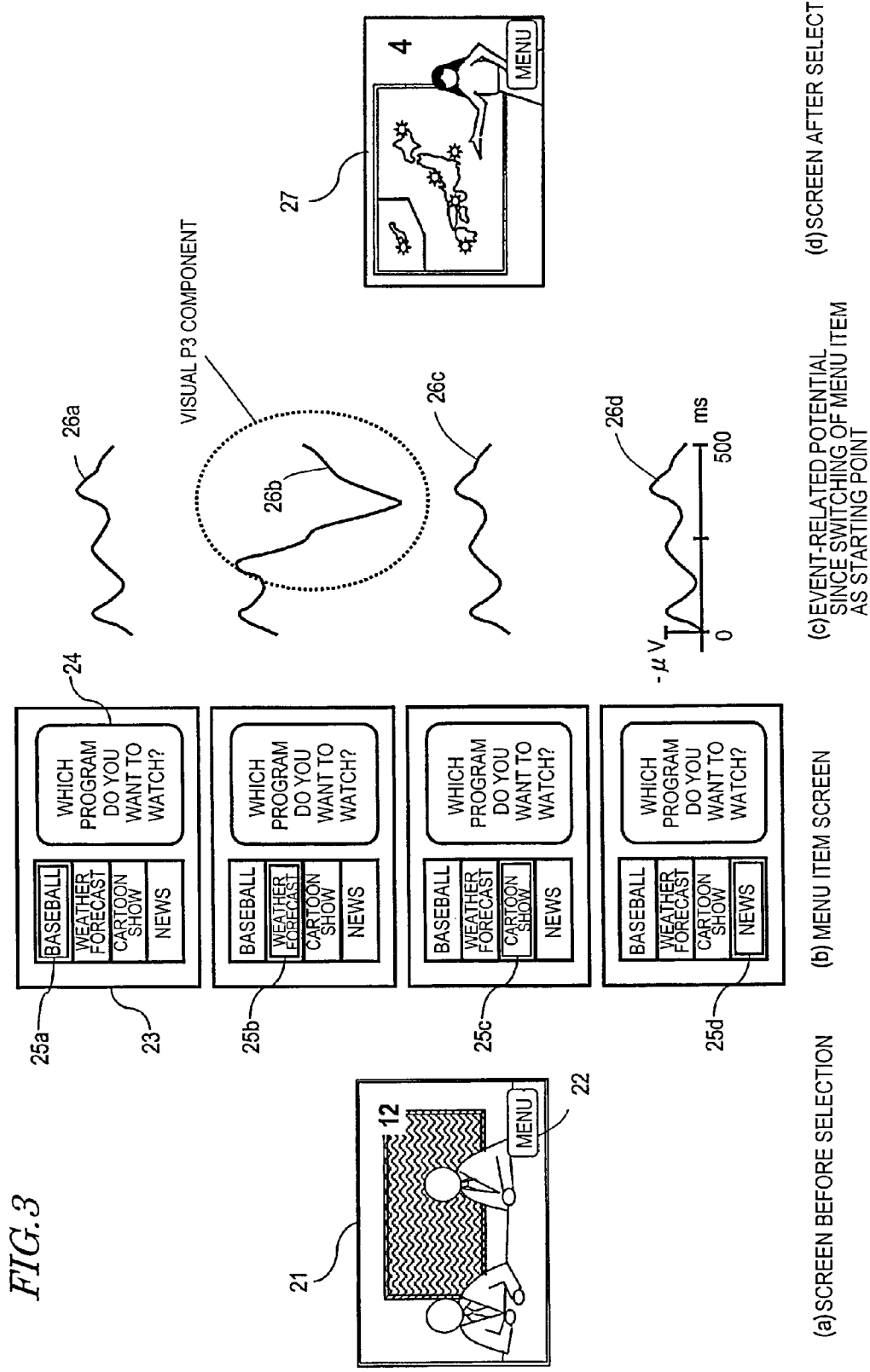
FIG. 3 (a) to (d) are diagrams showing an example where a TV 10 is manipulated in the electroencephalogram interface system 1 and a user 3 watches a program of a genre which he or she wishes to view.

FIG. 3(*c*) shows event-related potentials of electroencephalogram signals from the user 3 which is acquired by the electroencephalograph 18. The starting point for acquiring an event-related potential is set to a moment when each option is highlight-indicated. An event-related potential from e.g. 200 milliseconds before and until 1 second after this moment is extracted from the electroencephalogram signal. As a result, a response of the user 3 for the item which is highlight-indicated is obtained.

It is assumed that the user 3 is currently wishing to watch "weather forecast" 25*b*. Among electroencephalogram signals 26*a* to 26*d* respectively corresponding to the options 25*a* to 25*d*, an electroencephalogram signal 26*b* from the user 3 when "weather forecast" is highlighted shows that a characteristic positive component (visual P3 component) appears with a latent period of about 300 milliseconds since the point of highlighting "weather forecast" as a starting point. Therefore, determining that the option for which this visual P3 component has been detected is the program which user 3 wishes to view, the device control section 5 switches the channel to a channel of the weather forecast. FIG. 3(*d*) shows a screen 27 after the channel of the weather forecast is selected.

Figure 4:
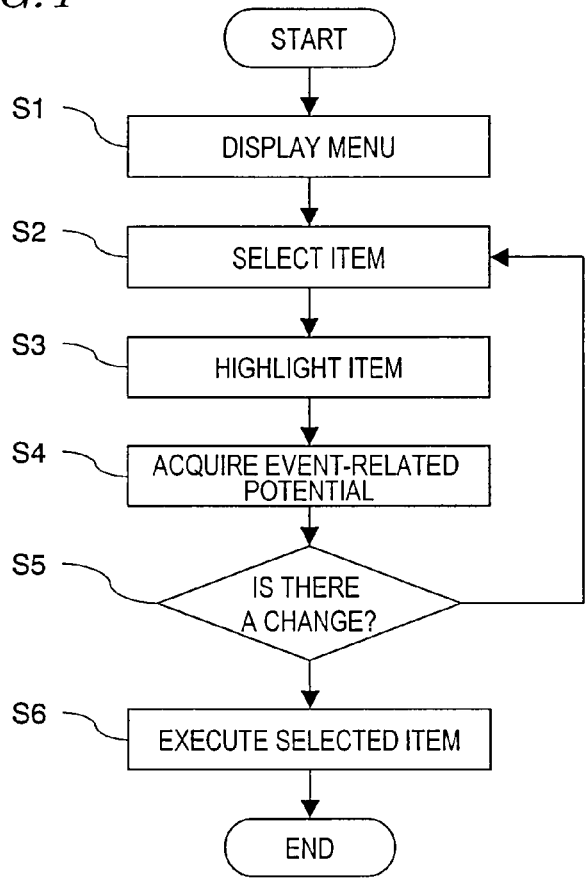
FIG. 4 A flowchart showing a processing procedure by the device control section 5 after activation of an electroencephalogram interface.

FIG. 4 shows a processing procedure by the device control section 5 after activation of the electroencephalogram interface.

At step S1 after activation of the electroencephalogram interface, the device control section 5 displays a menu 23 shown in FIG. 3(*b*). At step S2, the device control section 5 selects e.g. the item "baseball" 25*a*, and at the next step S3, highlight-indicates the selected item "baseball" 25*a*.

At step S4, by using the highlight indication of the item as a starting point, the device control section 5 acquires an event-related potential from the electroencephalogram signal which is output from the electroencephalograph 18.

At step S5, the device control section 5 determines whether any waveform change that is associated with highlighting of the item whose selection is desired exists in the acquired event-related potential. If the waveform change exists, control proceeds to step S6; if the waveform change does not exist, control returns to step S2 to perform highlight indication of the next item (e.g. "weather forecast" 25*b*). By distinguishing the presence or absence of a visual P3 component, it can be determined whether the waveform of the currently-acquired electroencephalograms is a waveform for an item which the user 3 wishes to select or a waveform for an item which the user 3 does not wish to select.

At step S6, the device control section 5 executes a function (channel switching) corresponding to the item for which a visual P3 component has appeared.

Through the above processing, the user 3 can select a menu item based on electroencephalograms, without manipulating a button. Although it is assumed in step S2 that items are selected in order, a method of randomly presenting them would also be possible. This leads to a possibility that the menu selection might be made more carefully because it is not known in advance which item will be selected.

Next, the activation apparatus 2 will be described in detail. The operation principles of the activation apparatus 2 will be first described, followed by a description of the construction and operation of the activation apparatus 2.

Figure 5:
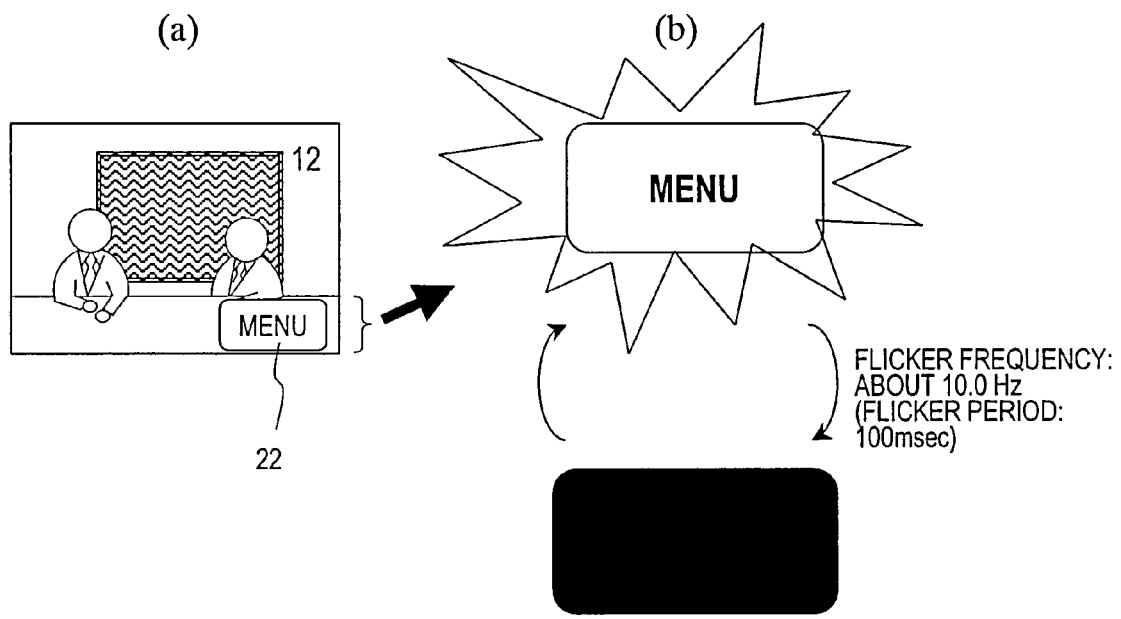
FIG. 5 (a) is a diagram showing a menu icon 22 which is displayed on a screen; and (b) is a diagram showing an example of a menu icon 22 which flickers through repetition of inversion and non-inversion.

FIG. 5(*a*) shows the menu icon 22 being displayed on the screen. In the present embodiment, the menu icon 22 is flickering with a period of 100 milliseconds (frequency about 10.0 Hz). Flickering may be through repetition of displaying and non-displaying, or repetition of inversion and non-inversion. FIG. 5(*b*) shows an example of a menu icon 22 flickering through repetition of inversion and non-inversion. It may be any signal that can present a visual stimulation to the user 3. For example, glowing and dimming of an icon which only involves changing luminance also falls within flickering because a steady-state visual evoked potential will be observed.

Paying attention to the significant difference between an electroencephalogram signal from the user 3 when looking at the flickering menu icon 22 and an electroencephalogram signal from the user 3 when not looking at it, the inventors have thought that it should be possible to determine whether the user 3 has been looking at the flickering menu icon 22 or not by analyzing the electroencephalogram signal that is obtained.

FIG. 6(*a*) shows an example of a frequency analysis result for electroencephalograms when the user 3 is not looking at the flickering icon, whereas FIG. 6(*b*) shows an example of a frequency analysis result for electroencephalograms when the user 3 is looking at the flickering icon. In both, the horizontal axis is frequency (unit: Hz), and the vertical axis is signal intensity. Signal intensity, also referred to as frequency power (unit: μV·μV/Hz), is obtained as a coefficient value which is calculated by Fast Fourier Transform (FFT), for example. The flicker period of the icon is 100 milliseconds, that is, the flicker frequency is about 10.0 Hz.

An analysis of FIGS. 6(*a*) and (*b*) indicates that, in (*a*), no particular change in signal intensity is observed in the neighborhood of 10.0 Hz; but, in (*b*), a local peak is observed in the neighborhood of 10.0 Hz as encircled by a broken line 32. Therefore, by providing a threshold for signal intensity and detecting a peak whose signal intensity in the neighborhood of 10.0 Hz is equal to or greater than the threshold, it becomes possible to determine whether the user 3 has been looking at the flickering menu icon 22 or not. If it is determined that the menu icon 22 has been looked at, the activation apparatus 2 may be allowed to operate by judging that activation of the electroencephalogram interface is requested. For example, the activation apparatus 2 may instruct the device control section 5 to display the menu item shown in FIG. 3(*b*).

Note that the neighborhood or vicinity of a flicker frequency includes any frequency within the range of ±0.2 Hz from the flicker frequency. The reason is that, according to Non-Patent Document 2, humans are able to distinguish a flicker frequency of a visual stimulation with a resolution of about 0.2 Hz.

Next, with reference to FIG. 7, the construction and detailed operation of the activation apparatus 2 operating based on the aforementioned principles will be described.

Figure 7:
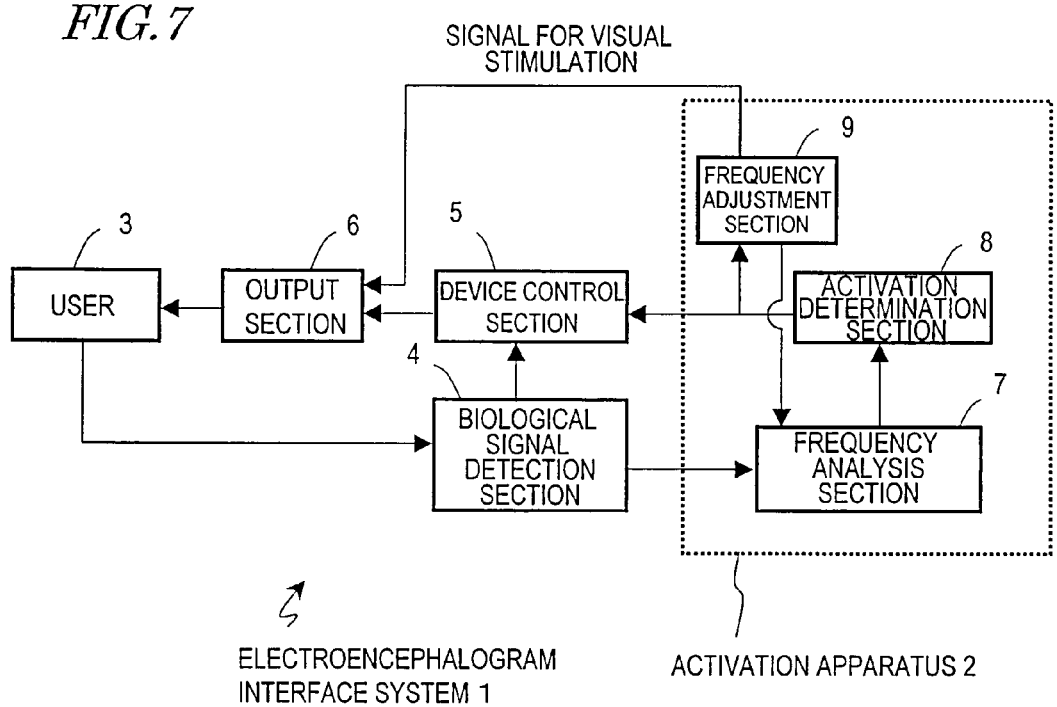
FIG. 7 A diagram showing a functional block construction of the electroencephalogram interface system 1 including an activation apparatus 2 according to Embodiment 1.

FIG. 7 shows the functional block construction of the electroencephalogram interface system 1 including the activation apparatus 2 according to the present embodiment.

The electroencephalogram interface system 1 includes the activation apparatus 2, the biological signal detection section 4, the device control section 5, and an output section 6. FIG. 7 also shows the functional block construction of the activation apparatus 2. The user 3 block is illustrated for convenience of explanation. Note that the output section 6 represents the screen of a TV or the like for presenting a menu, video contents, and the like to the user 3.

Before activation of the electroencephalogram interface, the user 3 is able to activate the electroencephalogram interface by merely looking at flickering of the menu icon 22 which is presented by the activation apparatus 2 on the output section 6. On the other hand, after activation of the electroencephalogram interface, by merely looking at the highlight indication of a menu item concerning a device manipulation, which is presented by the device control section 5 on the output section 6, it is possible to select a function corresponding to that menu item and have it executed by the device control section 5. In either case, the user 3 does not need to make any manipulation input with e.g. a button.

The activation apparatus 2 is connected to the biological signal detection section 4 and the device control section 5 in a wireless or wired manner, and performs transmission and reception of signals.

The biological signal detection section 4 corresponds to the aforementioned electroencephalograph 18 (FIGS. 1 and 2), and measures electroencephalograms as a biological signal. The electroencephalograph may be a head-mount type electroencephalograph as shown in FIG. 1. It is assumed that the user 3 has put on the electroencephalograph in advance. The biological signal detection section 4 may output the electroencephalogram signal as digital data via internal processing, or output it as analog data without subjecting it to internal processing.

Electrodes are disposed on the biological signal detection section 4 so that, when worn on the head of the user 3, the electrodes come into contact with the head at predetermined positions. The positioning of the electrodes may be, for example, Pz (median parietal), A1 (earlobe), and the nasion of the user 3. However, it will suffice if there are at least two electrodes, and potential measurement will be possible with only Pz and A1, for example. These electrode positions are to be determined based on reliability of signal measurements, wearing ease, and the like.

Thus, the biological signal detection section 4 is able to measure the electroencephalogram signal (including the event-related potential) of the user 3. The measured electroencephalograms of the user 3 are sampled so as to be computer-processible, and are sent to the activation apparatus 2 and the device control section 5. Note that, in order to reduce the influence of noises which may be mixed in the electroencephalograms, the electroencephalograms to be measured in the biological signal detection section 4 are subjected to band-pass filtering from e.g. 0.05 to 20 Hz in advance, and to baseline correction with respect to an average potential at e.g. 100 milliseconds before highlighting of menu items.

The device control section 5 presents menu items concerning device manipulations to the user 3, cuts out the electroencephalograms measured by the biological signal detection section 4, and subjects it to distinction. Then, it controls the device operation according to the distinction result. The basic operation of the device control section 5 is as described above.

The activation apparatus 2 includes a frequency analysis section 7, an activation determination section 8, and a frequency adjustment section 9.

The frequency analysis section 7 analyzes the frequency of the electroencephalogram signal detected by the biological signal detection section 4, and calculates a signal intensity (frequency power) at each frequency. As mentioned above, a frequency power of electroencephalograms is a coefficient value which is calculated by fast Fourier transform. The subject of analysis may be the entire frequency band; however, in the present embodiment, for rapid processing, the frequency analysis section 7 receives from the frequency adjustment section 9 information that identifies a frequency which is the subject of analysis (flicker frequency), and analyzes the signal intensity in a frequency band in the neighborhood or vicinity of that flicker frequency.

Based on the result analyzed by the frequency analysis section 7, the activation determination section 8 determines whether the frequency power in the flicker frequency vicinity is equal to or greater than the threshold, and determines presence or absence of a local peak (peak within the dotted line 32 in FIG. 6(*b*)). If it is determined that a local peak exists, the activation determination section 8 instructs the device control section 5 to execute an electroencephalogram interface function. As a result, the device control section 5 executes the electroencephalogram interface function, and determines a control method for the device based on an event-related potential of the electroencephalograms of the user 3. Since it is no longer necessary to flicker the menu when executing the electroencephalogram interface function, the activation determination section 8 instructs the frequency adjustment section 9 to end displaying and flickering of the menu.

Based on an instruction from the activation determination section 8, the frequency adjustment section 9 starts or stops generation of a video signal of the menu icon 22 flickering at the frequency as instructed (signal for visual stimulation). The frequency adjustment section 9 outputs the generated signal for visual stimulation to the output section 6, and also outputs information identifying the frequency of the signal for visual stimulation to the frequency analysis section 7.

Figure 8:
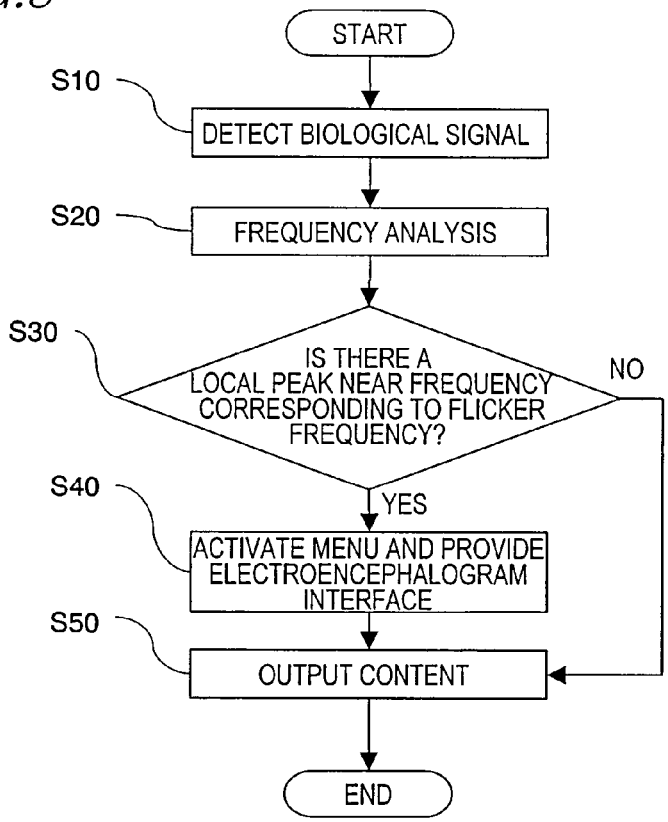
FIG. 8 A flowchart showing a processing procedure related to activation of the electroencephalogram interface according to Embodiment 1.

FIG. 8 shows a processing procedure related to the activation of the electroencephalogram interface 1 according to the present embodiment. Among the processes from steps S10 to S50, any process other than provision of an electroencephalogram interface at step S40 pertains to the electroencephalogram interface activation process.

The process shown in FIG. 8 is executed when the user 3 is simply viewing a program on the TV 10 while wearing the electroencephalograph 18, for example.

At step S10, the biological signal detection section 4 worn on the head of the user 3 detects an electroencephalogram signal. At step S20, the frequency analysis section 7 subjects the detected electroencephalogram signal to frequency analysis. The span of time to be subjected to the analysis process may be a zone from a predetermined time ago until the present, for example. The predetermined time may be e.g. 1000 ms, 2000 ms, or may be determined based on the response time required for the device and the required accuracy of frequency analysis. Among the frequencies contained in the electroencephalogram signal, the frequency analysis section 7 calculates a signal intensity (frequency power) for a frequency band in the neighborhood of the flicker frequency.

At step S30, based on a previously-set threshold, the activation determination section 8 determines whether or not a local peak exists near the frequency corresponding to the flicker frequency. This determination is a determination as to whether the user 3 desires activation of a menu for an electroencephalogram interface.

If a local peak exists, the process proceeds to step S40. On the other hand, if a local peak does not exist, the process proceeds to step S50, and the content continues to be output.

At step S40, the device control section 5 displays a menu for an electroencephalogram interface, and provides an electroencephalogram interface for the user 3. This process corresponds to the processes of FIGS. 3(*b*) and (*c*).

At step S50, the output section 6 presents information such as a content to the user 3. If the electroencephalogram interface has been activated (in the case of being executed after step S40), a content that is based on the processing which is determined via the electroencephalogram interface is output at step S50. On the other hand, if the electroencephalogram interface has not been activated (in the case of being executed after branching from step S30), the program on the TV 10 which the user 3 has so far been viewing continues to be presented.

Thus, by analyzing the electroencephalograms of the user 3, it is possible to determine whether it is necessary to activate an electroencephalogram interface or not, and switch the processing of the electroencephalogram interface system 1 based on the determination result.

As described above, by acquiring the electroencephalogram signal from the user 3 irrespective of whether the electroencephalogram interface has been activated or not, an electroencephalogram interface system 1 is realized which is capable of activating an electroencephalogram interface and selecting a menu item after interface activation. A practical electroencephalogram interface system can be provided because the manipulation for a series of processes, consisting of activation and execution of an electroencephalogram interface and processing after switching, are realized based only on electroencephalograms. Therefore, in situations where the hands are full, e.g., while driving a car or holding a baby, it is possible to activate an electroencephalogram interface and control the operation of a device.

Figure 9:
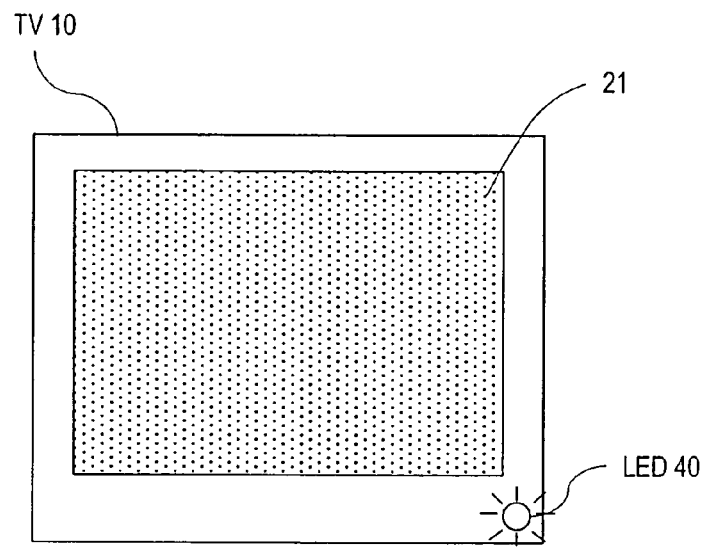
FIG. 9 A diagram showing an example where a light-emitting diode (LED) 40 for menu activation is provided in a frame portion outside a screen 21 of the TV 10.

In the description of the above-described example, the menu activation icon for the electroencephalogram interface is displayed on the screen of the TV 10. However, other than an icon on the screen, a visual stimulation of a predetermined frequency can be presented to the user 3. For example, FIG. 9 shows an example where a frame portion outside the screen 21 of the TV 10, a light source for presenting a visual stimulation for menu activation (a light-emitting diode (LED) in the present embodiment) 40 is provided. This LED is also encompassed by the output section 6. In the case where this LED is implemented as an independent piece of hardware separate from the TV 10 at a position away from the screen of the TV 10 and its frame, the TV and the LED are encompassed by the output section.

When the frequency adjustment section 9 controls the flicker frequency of the LED 40, a visual evoked potential is acquired. This approach is characterized in that, since no icon for menu activation exists on the screen itself, there is no need to display an icon for menu activation so as to be superposed on a content. As a result, the image processing circuit 5*e* (FIG. 2) can be simplified. Moreover, since there is no icon flickering within the screen, content viewing is not obstructed.

Furthermore, there is also an advantage in that controlling the flicker frequency of an LED permits a greater degree of freedom than does a menu activation icon on a television screen. The reason is that, a menu activation icon on a television screen would be under constraints concerning the refresh rate of the television screen. For example, when a content of 30 frames/second is being broadcast, a flicker frequency of 30 Hz or more cannot be realized if a menu activation icon is written on the content itself.

Although the flicker frequency of visual stimulation is illustrated as about 10.0 Hz in the present embodiment, this value is exemplary. The flicker frequency can be set within a range from 0.5 Hz to 24 Hz, for example. However, if the frequency is too low, time will be consumed for the determination as to whether or not to activate the electroencephalogram interface. Therefore, as a practical range, frequencies from 5 Hz to 24 Hz would be more preferable.

(Embodiment 2)

In Embodiment 1, the flicker frequency of one menu activation icon (or LED) is fixed, and is utilized for the determination as to whether or not to execute an electroencephalogram interface function.

In the present embodiment and the next embodiment, electroencephalogram interface systems will be described in which the flicker frequency of the menu activation icon is variable, and the flicker frequency is controlled so as to adapt to various situations. Since there is one menu activation icon, there is no need to consider relationships with the flickering of other icons or the like as in Non-Patent Document 2. Moreover, since the icon is allowed to flicker on the TV screen through video signal processing, it is possible, by changing the processing, to change the flicker frequency.

Note that, in the aforementioned Non-Patent Document 2, a multitude of LEDs having different flicker frequencies are arranged, a frequency which appears in the electroencephalogram signal of the user is detected, and it is identified which LED has been watched, thus achieving a similar effect to menu selection. Since a plurality of LEDs are provided according to flicker frequencies, the flicker frequency of each LED is a fixed value, and is not expected to vary.

Hereinafter, a construction and processing for realizing adjustment of the flicker frequency according to the present embodiment will be described. In the present embodiment, too, an example of flickering a menu activation icon will be illustrated.

First, the reason why adjustment of the flicker frequency is needed will be described.

A plurality of detrimental factors concerning sure transmission of the flicker frequency of a menu activation icon as a person's visual evoked potential are conceivable.

A first detrimental factor is that, when a content displayed on the screen flickers or the entire screen varies with a constant period, e.g. in a scene of a movie where an electric light is glowing and dimming, its influence is believed to influence the visual evoked potential. When a person is viewing a content, if the content itself contains a frequency component similar to the flicker period of an icon for menu activation, it is possible for the electroencephalogram interface system to erroneously recognize that the icon for menu activation has been watched.

As a second detrimental factor, it is necessary to take into consideration the fluctuations of the electroencephalograms of a person that are caused by factors other than the visual evoked potential. Electroencephalograms are always detectable, even at usual times when a person is remaining still or leading daily life. Generally speaking, the electroencephalograms for anything which a subject of experiment is not paying attention to is referred to as background electroencephalograms. The background electroencephalograms may exhibit a frequency distribution as in the example of FIG. 6(*a*), but its distribution may be various. Factors that influence changes in the distribution may include the person's arousal state (whether he is sleepy or clearly awake), attention state (how much attention is paid to the screen), fatigue state, and manner of moving the eyes, and so on. If the detected electroencephalogram signal frequency becomes close to the flicker frequency of the menu activation icon due to such factors, it is possible for the electroencephalogram interface system to erroneously recognize that the icon for menu activation has been watched.

As described earlier, an electroencephalogram signal is affected by external factors such as changes in the content which is being presented and the person's state. Therefore, in order to highly accurately detect the will of the user 3 to activate a menu based on an electroencephalogram signal, it is necessary to detect changes within the content that is currently being presented and the person's state, and change the flicker frequency of the menu activation icon.

In the present embodiment, an activation apparatus will be described which detects instances of the aforementioned first and second detrimental factors based on changes in the electroencephalograms, and changes the flicker frequency of a menu activation icon. Hereinafter, with reference to FIG. 10 to FIG. 12, the electroencephalogram interface system of the present embodiment will be described.

Note that the construction and environment of use for the electroencephalogram interface system of the present embodiment are the same as in the example shown in FIG. 1, and the hardware construction thereof is the same as in the example shown in FIG. 2. The functions of the systems of Embodiments 1 and 2 differ based on differences in the computer programs executed.

Figure 10:
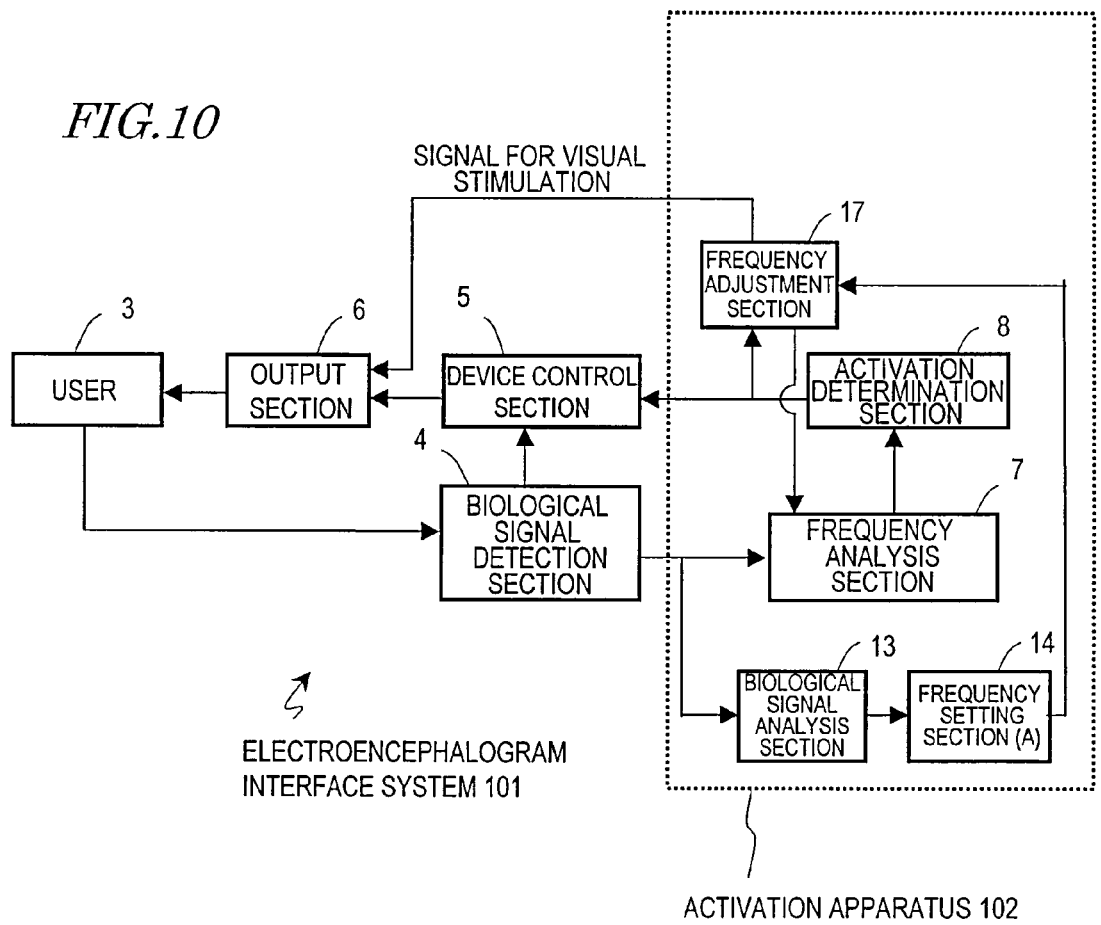
FIG. 10 A diagram showing a functional block construction of an electroencephalogram interface system 101 including an activation apparatus 102 according to Embodiment 2.

FIG. 10 shows the functional block construction of an electroencephalogram interface system 101 including an activation apparatus 102 according to the present embodiment. In FIG. 10, component elements having the same functions as those of the electroencephalogram interface system 1 in FIG. 1 are denoted by like reference numerals, and the descriptions thereof are omitted.

Differences from the electroencephalogram interface system 1 of Embodiment 1 are as follows. As compared to the activation apparatus 2, the activation apparatus 102 additionally includes a biological signal analysis section 13 and a frequency setting section (A) 14. Furthermore, a frequency adjustment section 17 which is included in the activation apparatus 102 has a new function over the functions of the frequency adjustment section 9 of the activation apparatus 2.

Among the additionally-introduced component elements, the biological signal analysis section 13 and the frequency setting section (A) 14 are component elements for detecting changes in the electroencephalograms of the user. Hereinafter, these additional constituents will be mainly described.

The biological signal analysis section 13 analyzes and outputs the frequency of the electroencephalogram signal from the user 3. The output may be the signal intensity (frequency power) at each frequency, or a frequency distribution as shown in FIG. 6(a) or (b).

Based on the result of frequency analysis by the electroencephalogram signal from the user 3, the frequency setting section (A) 14 identifies a frequency which is not suitable for use as a flicker frequency for the menu activation icon. For example, in the case where the α wave band (8 to 13 Hz) is gradually increasing in intensity in the electroencephalogram signal from the user 3, the frequencies of the α wave band are identified as frequencies which are not suitable for use as a flicker frequency for the menu activation icon. The reason is that detection of the visual evoked potential is expected to become difficult if the flicker frequency of the icon is contained in this band. The frequency setting section (A) 14 outputs information which indicates the identified frequency.

From the frequency setting section (A) 14, the frequency adjustment section 17 receives information of the frequency which is not suitable for use as a flicker frequency for the menu activation icon, and sets a frequency which does not correspond to this frequency as a flicker frequency for the menu activation icon. Then, based on an instruction from the activation determination section 8, the frequency adjustment section 17 starts or stops generation of a video signal (signal for visual stimulation) for the menu icon 22 flickering at the frequency having been set. The frequency adjustment section 17 outputs the generated signal for visual stimulation to the output section 6. It also outputs information identifying a frequency of the signal for visual stimulation to the frequency analysis section 7.

Figure 11:
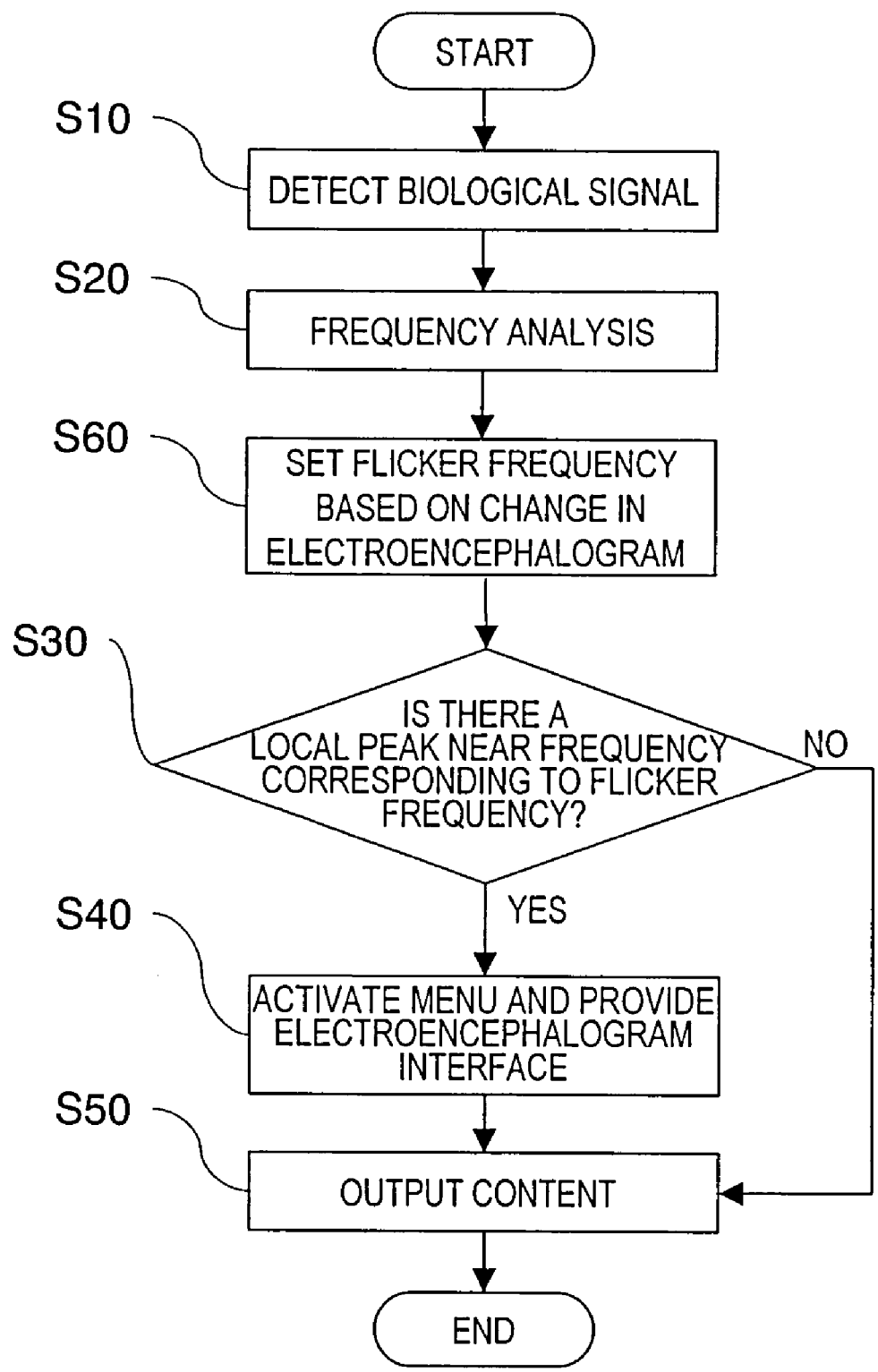
FIG. 11 A flowchart showing a processing procedure related to activation of the electroencephalogram interface according to Embodiment 2.

FIG. 11 shows a processing procedure related to the activation of the electroencephalogram interface according to the present embodiment. Among steps S10 to S60 included in FIG. 11, those steps which are identical to the steps in FIG. 8 will be denoted by like step numbers, and the descriptions thereof will be omitted. In the present embodiment, step S60 is added between steps S20 and S30.

At step S60, the biological signal analysis section 13 and the frequency setting section (A) 14 set a flicker frequency based on changes in the electroencephalograms of a person. More specifically, based on the result of frequency analysis of the electroencephalogram signal from the user 3 by the biological signal analysis section 13, the frequency setting section (A) 14 identifies a frequency which is not suitable for use as a flicker frequency for the menu activation icon. Through this step, a constant monitoring is performed as to the frequency characteristics in the case where the content itself contains a frequency component similar to the flicker period of the icon for menu activation, or as to whether the frequency characteristics at each moment that are ascribable to the person's internal state fall close to the flicker frequency of the menu activation icon having already been set. If close, the flicker frequency of the menu activation icon is changed.

Figure 12:
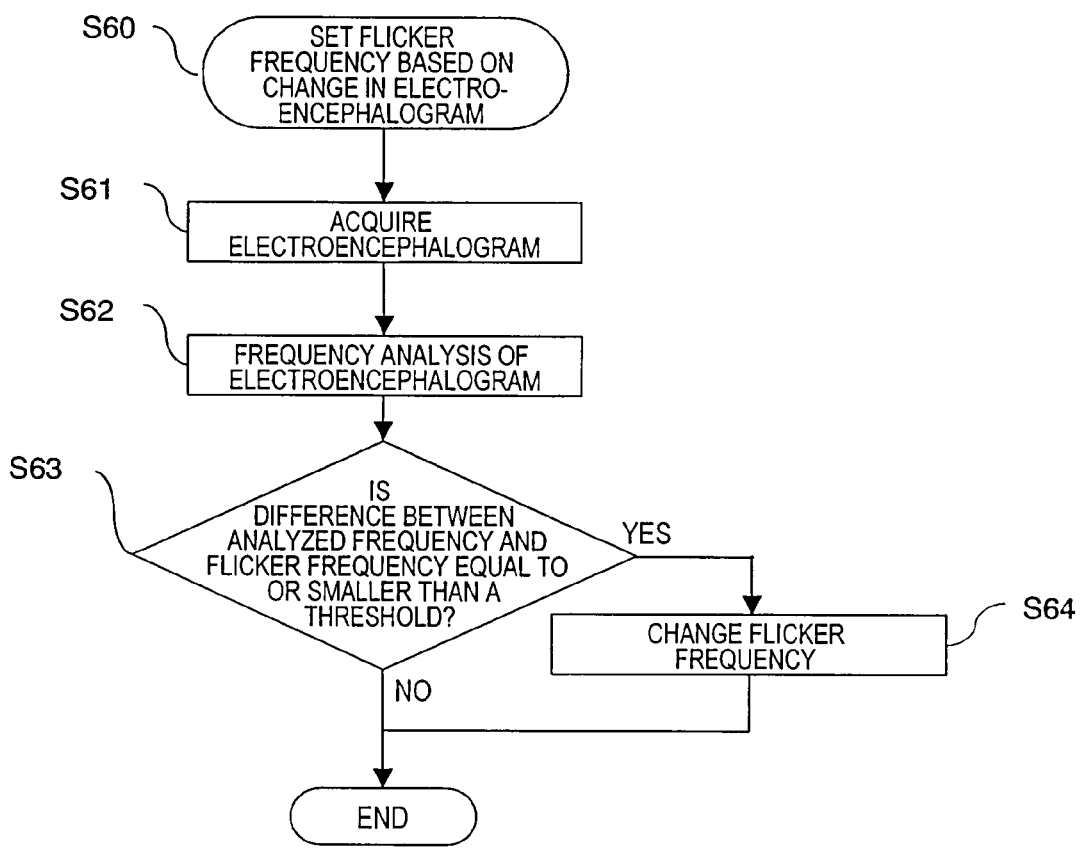
FIG. 12 A flowchart showing the procedure of a process of setting a flicker frequency based on changes in the electroencephalograms of a person (step S60 of FIG. 11).

FIG. 12 shows a procedure of a process of setting a flicker frequency based on changes in the electroencephalograms of a person (step S60 of FIG. 11).

First, at step S61, the biological signal analysis section 13 acquires the current electroencephalogram signal from the user 3 from the biological signal detection section 4. At the next step S62, the biological signal analysis section 13 continuously analyzes the frequency of the electroencephalogram signal, and ascertains what sort of electroencephalograms are being issued from the user 3. As a result, the trend of changes in the electroencephalogram signal from the user 3 is identified. The trend of changes in the electroencephalogram signal from the user 3 depends on the state of the user 3, or, in the case where the content itself is flickering, etc., depends on that flicker frequency.

A state of the user 3 refers to an internal state indicating how sleepy the user 3 is or how concentrated the user 3 is, for example. For example, if the user 3 begins to feel sleepy, the intensity of the a wave band (8 to 13 Hz) gradually increases. The biological signal analysis section 13 identifies an increasing trend of the intensity of the a wave band.

At step S63, the frequency setting section (A) 14 determines whether the difference between the analyzed frequency and the flicker frequency is equal to or smaller than a threshold or not. As the threshold, 0.2 Hz is set, for example. This process means determining whether the current flicker frequency of the icon for electroencephalogram interface activation has become difficult to be detected or not. Although 0.2 Hz is illustrated as an exemplary threshold for frequencies which are impossible to be distinguished, it will be possible to exclude frequencies which are difficult to be distinguished by setting an even larger threshold. Frequency changes which emanate from the user's state may not just be a specific frequency, but may fluctuate within a frequency range having a certain breadth, in which case the threshold needs to be even greater.

If the determination result proves equal to or smaller than the threshold, the process proceeds to step S64; if it is not equal to or smaller than the threshold, the process is ended.

At step S64, as a frequency which is not suitable for use as a flicker frequency for the menu activation icon, the frequency setting section (A) 14 notifies the information of the analyzed frequency to the frequency adjustment section 17. As a flicker frequency, the frequency adjustment section 17 sets a frequency which is different from the notified frequency, and causes the menu activation icon to flicker.

For example, if it is determined at step S63 that the difference between the frequencies of the α wave band and the flicker frequency is equal to or smaller than the threshold, the frequency setting section (A) 14 outputs information indicating the frequencies of the α wave band (8 to 13 Hz). Then, within the range of flicker frequencies having been set (e.g., 0.5 Hz to 24 Hz), the frequency adjustment section 17 causes the menu activation icon to flicker at a flicker frequency (e.g. 5 Hz or 15 Hz) which is different from the frequencies of the α wave band.

As used herein, the "different flicker frequency" means a frequency notified from the frequency setting section (A) 14, i.e., a frequency differing by the aforementioned threshold (e.g. 0.2 Hz) or more from the frequencies of the a wave band detected from the user 3.

The frequency which is set by the frequency adjustment section 17 may be set to a frequency having the least signal intensity within the power spectrum of when not looking at flickering, for example. As a result, differences from any increase in the influence due to flickering of the menu activation icon can be made clear.

Moreover, by setting the flicker frequency of the icon so as to take the refresh rate of the display into consideration, it becomes possible to control flickering based solely on software. When displaying an icon on the display, the displayed image is rewritten in synchronization with the refresh rate (vertical frequency) of the display. Therefore, assuming that the refresh rate is 60 Hz, for example, the displaying of the icon may be switched so that the icon is displayed every three rewrites (i.e., every 3 periods) but that the icon is not displayed at any other rewrite timing, whereby it becomes possible to flicker the icon at 20 Hz. Note that the timing of rewriting the displaying of the icon can be controlled by software means. Therefore, by similarly displaying the icon every 4 periods/5 periods/6 periods and not displaying the icon at any other timing, 15 Hz/12 Hz/10 Hz can be realized. The frequency to be set that satisfies the conditions may be selected from among these frequencies.

Thus, various setting methods are possible. Basically, it is possible to set any arbitrary flicker frequency that is different from the notified frequency, within the range of flicker frequencies having been set (e.g., 0.5 Hz to 24 Hz).

Through such processing, without being influenced by changes in frequency intensity that are associated with changes in the electroencephalograms of a person's internal state and the like, it is possible to determine whether the flicker frequency of an icon for electroencephalogram interface activation is appearing as a steady-state visual evoked potential on the electroencephalograms or not.

(Embodiment 3)

In Embodiment 2, changes in the electroencephalograms are detected by utilizing the fact that changes in a content which is currently presented or a person's state affects the visual evoked potential, and the flicker frequency of a menu activation icon is changed based on the changes in the electroencephalograms.

In the present embodiment, changes in a content which is currently presented are detected by analyzing the content, and the flicker frequency of a menu activation icon is changed by utilizing this result.

Figure 13:
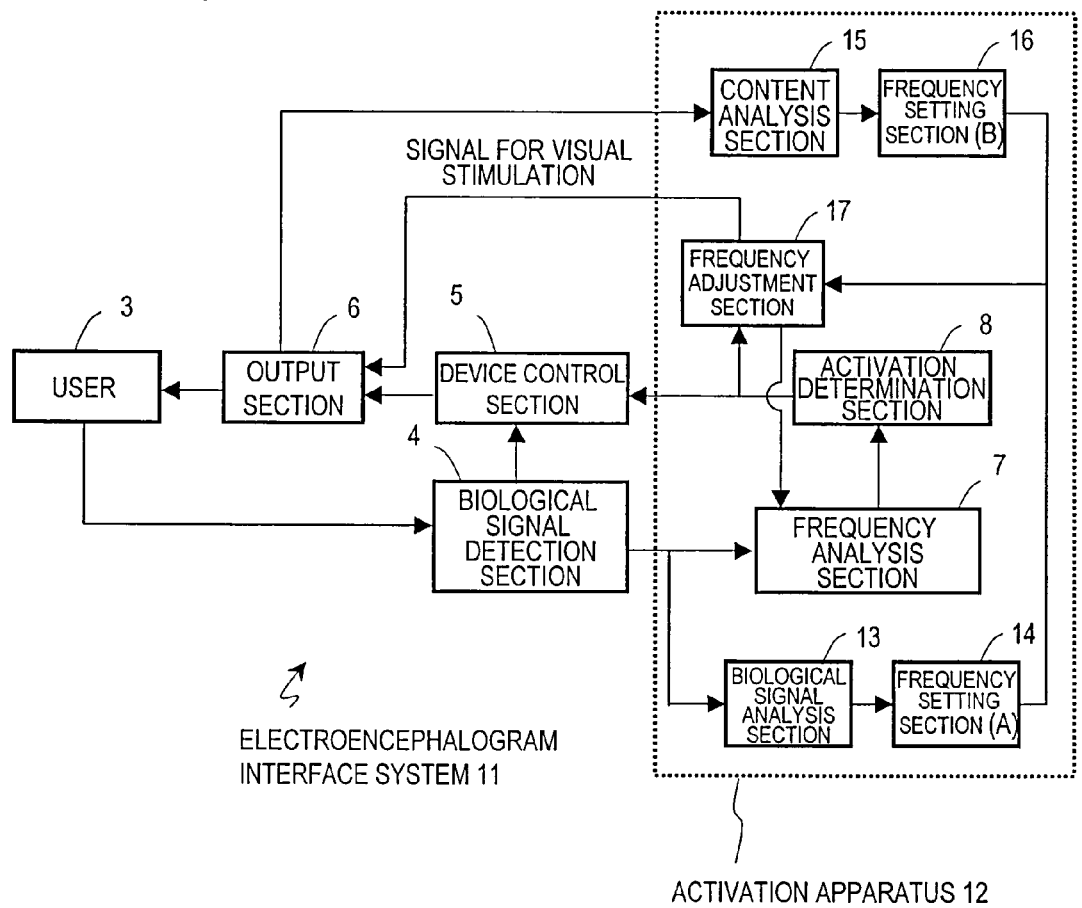
FIG. 13 A diagram showing a functional block construction of an electroencephalogram interface system 11 including an activation apparatus 12 according to Embodiment 3.

FIG. 13 shows the functional block construction of the electroencephalogram interface system 11 including the activation apparatus 12 of the present embodiment. In FIG. 13, component elements having the same functions as those of the electroencephalogram interface system 101 in FIG. 10 are denoted by like reference numerals, and the descriptions thereof are omitted.

In the electroencephalogram interface system 11, an output signal of a content to be presented by the output section 6 is input to the activation apparatus 12. As compared to the activation apparatus 102 (FIG. 10), the activation apparatus 12 additionally includes a content analysis section 15 and a frequency setting section (B) 16.

The additionally-introduced content analysis section 15 and the frequency setting section (B) 16 are component elements which cope with changes in the presented content. Hereinafter, these additional constituents will be mainly described.

The content analysis section 15 analyzes a frequency which is related to changes in the currently-presented video content. Changes in the video content are changes in the output video in the screen, and in the case where the video content is glowing and dimming, for example, correspond to glowing and dimming.

Based on a frequency analysis result concerning changes in the video content, the frequency setting section (B) 16 identifies a frequency which is not suitable for use as a flicker frequency for the menu activation icon. For example, in one scene of a movie in which the video is glowing and dimming every 0.5 seconds, the frequency setting section (B) 16 identifies a frequency of 2 Hz as a frequency which is not suitable for use as a flicker frequency for the menu activation icon. The reason is that, if the flicker frequency of the icon is contained in this band, it is expected that detection of the visual evoked potential becomes difficult. The frequency setting section (B) 16 outputs information indicating the identified frequency.

The frequency adjustment section 17 receives frequency information from each of the frequency setting section (A) 14 and the frequency setting section (B) 16, and, as the flicker frequency for the menu activation icon, sets a frequency that corresponds to neither. Then, based on an instruction from the activation determination section 8, the frequency adjustment section 17 starts or stops generating a video signal (signal for visual stimulation) for a menu icon 22 which flickers at the frequency having been set. The frequency adjustment section 17 outputs the generated signal for visual stimulation to the output section 6. Moreover, it outputs information identifying the frequency of the signal for visual stimulation to the frequency analysis section 7.

Figure 14:
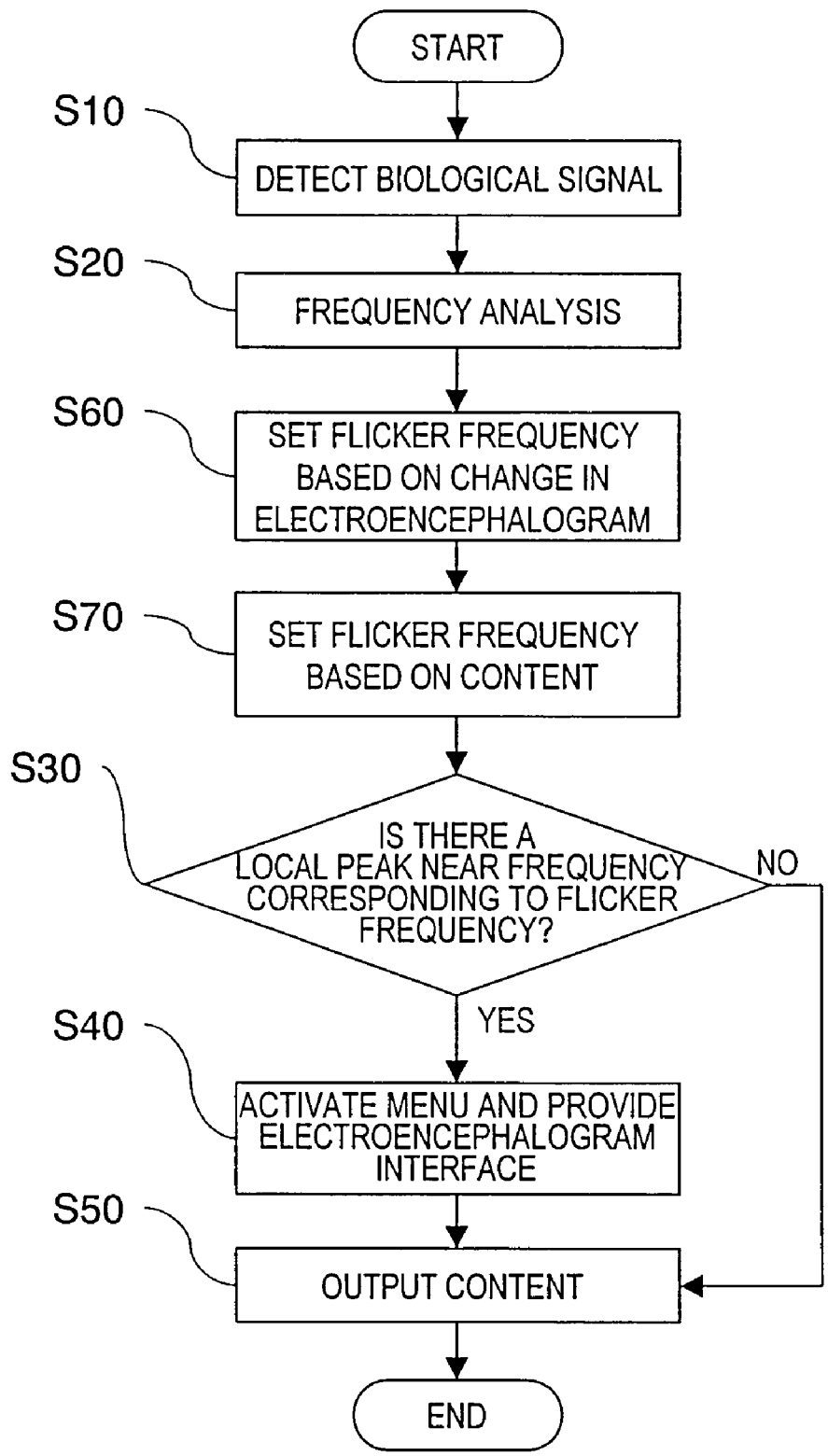
FIG. 14 A flowchart showing a processing procedure related to activation of the electroencephalogram interface according to Embodiment 3.

FIG. 14 shows a processing procedure related to activation of the electroencephalogram interface of the present embodiment. Among steps S10 to S70 included in FIG. 14, those steps which are identical to the steps in FIG. 11 are denoted by like step numbers, and the descriptions thereof will be omitted. In the present embodiment, step S70 is added between steps S60 and S30.

At step S70, the content analysis section 15 and the frequency setting section (B) 16 set a flicker frequency based on changes in the content. Through this step, it is always monitored as to whether the frequency characteristics of a content which changes from moment to moment are close to the already-set flicker frequency of the menu activation icon. If close, the flicker frequency of the menu activation icon is changed. The process of step S70 will be described later with reference to FIG. 15.

Figure 15:
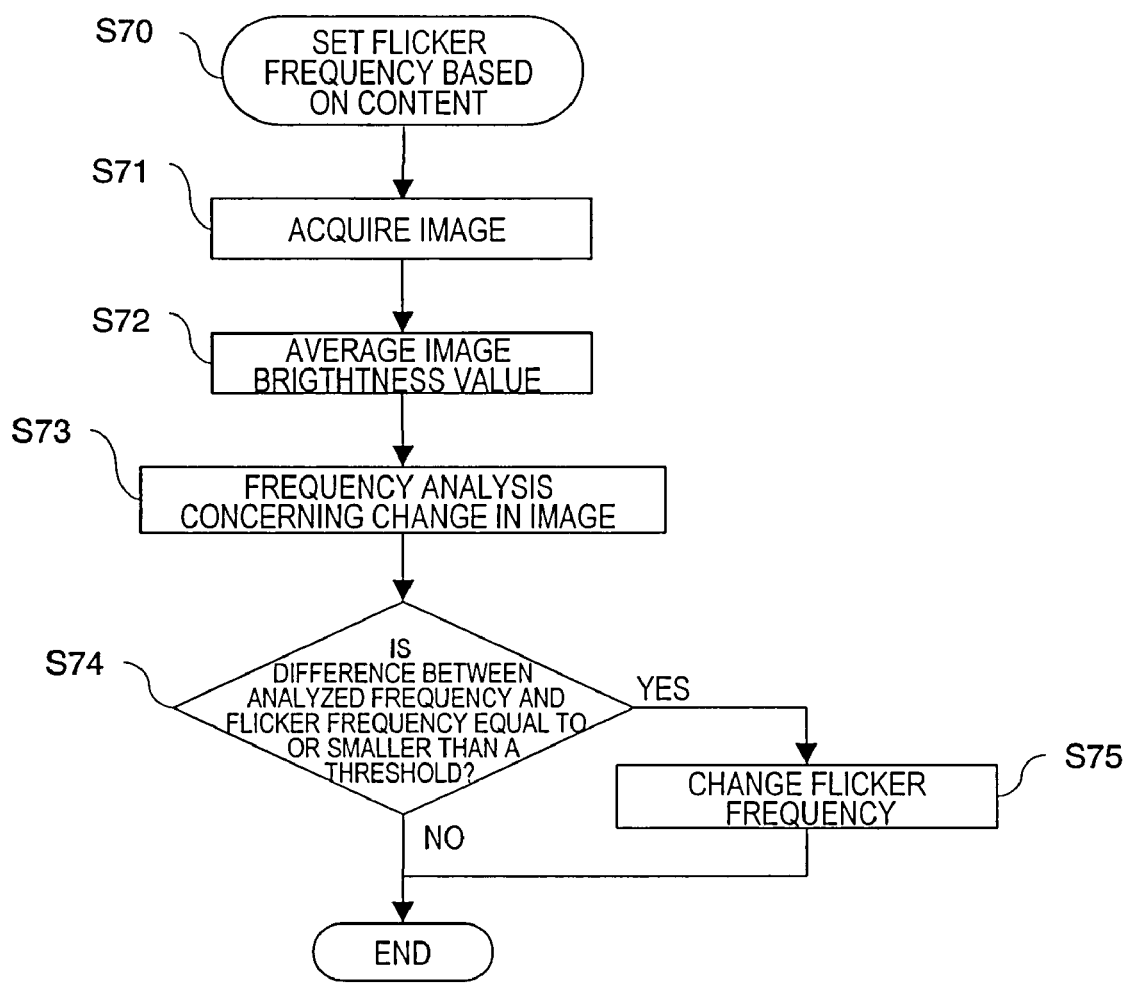
FIG. 15 A flowchart showing the procedure of a process of setting a flicker frequency based on changes in contents (step S70 of FIG. 14).

FIG. 15 shows the procedure of a process of setting the flicker frequency based on changes in the content (step S70 of FIG. 14).

First, at step S71, the content analysis section 15 acquires from the output section 6 a signal of a currently-output image (video content).

At step S72, the content analysis section 15 calculates an average value of the image luminance value. Based on the size of the resultant average value, the trend (brightness) of the entire screen can be grasped.

At step S73, the content analysis section 15 analyzes a frequency which is related to changes in the image. As a result, it is possible to know what frequency the entire screen is changing at.

At step S74, the frequency setting section (B) 16 determines whether or not a difference between the frequency at which the screen changes and the flicker frequency is equal to or smaller than a threshold. As the threshold, 0.2 Hz is set, for example. If the determination result proves equal to or smaller than the threshold, the process proceeds to step S75; if it is not equal to or smaller than the threshold, the process is ended.

At step S75, as a frequency which is not suitable for use as a flicker frequency for the menu activation icon, the frequency setting section (B) 16 notifies the information of the frequency at which the screen is changing to the frequency adjustment section 17. The frequency adjustment section 17 sets a frequency which is different from the notified frequency as the flicker frequency, and causes the menu activation icon to flicker.

Note that any arbitrary flicker frequency can be set so long as the frequency is different from the notified frequency. For example, among the frequencies that have been analyzed for detecting changes in the screen, the frequency having the lowest signal intensity may be set.

Through such processing, without being influenced by the frequency of the changes in the entire content (screen), it is possible to determine whether the flicker frequency of an icon for electroencephalogram interface activation is appearing as a steady-state visual evoked potential on the electroencephalograms or not.

Although FIG. 14 is illustrated so that step S70 is carried out next to step S60, this is exemplary. Step S70 may be carried out first, and then step S60. At the later step, the frequency adjustment section 17 is to set the flicker frequency based on frequency information which is received from both of the frequency setting section (A) 14 and the frequency setting section (B) 16.

Thus, by combining an analysis of a person's electroencephalograms and an analysis of a content, it is possible to set the flicker frequency of an icon for electroencephalogram interface activation at a point which is immune to both influences. As a result, the accuracy of the detection as to whether the user 3 is watching the icon for activation can be improved.

Moreover, there are characteristic differences between changes in the content and in a person's electroencephalograms. That is, a frequency change of a content is rapid, whereas a frequency change of a person is relatively slow. Therefore, against a change in the content, the current frequency setting value must be immediately changed. On the other hand, against a change in a person's electroencephalograms, future changes must be predicted based on the temporal changes up to then (for example, gradual increase in the signal intensity at a specific frequency), and the frequency setting value must be changed.

Note that, from the standpoint that matching between the flicker frequency of a menu activation icon the frequency of peak detection in the steady-state visual evoked potential is expected, it would be possible to regularly alter the flicker frequency, instead of keeping it constant. For example, by changing the flicker frequency every 1 second, even if a peak of the flicker frequency at a given moment fails to be detected due to some other factor, it will be possible to detect a peak at a different frequency 1 second later.

The present embodiment is illustrated so that the flicker frequency of the menu activation icon is changed. However, instead of an icon, an LED shown in FIG. 9 may be used and its flicker frequency may be changed.

The activation apparatus of the present embodiment is illustrated so that a process of setting a flicker frequency based on changes in a person's electroencephalograms and a process of setting a flicker frequency based on changes in the content are both executed. However, only one of them may be performed.

(Embodiment 4)

In Embodiments 1 to 3, in connection with manipulations of a television set or an information device, an electroencephalogram interface is activated by utilizing a steady-state visual evoked potential of electroencephalograms. The reason why such an electroencephalogram interface is needed is that a television set or an information device is multi-functional, and in order to correctly convey a user's request, it is necessary to select one of a plurality of options which correspond to a plurality of functions, by using an electroencephalogram interface.

However, among the devices that a user wishes to control, simple devices which do not require menu selection exist. Herein, a "simple device" refers to a device such that, once the device is identified, the operation thereof is substantially uniquely determined according to the situation.

Examples of simple devices are lighting devices and electromagnetic cookers. As for a lighting device, if a request to control is made when a light is on, the control would usually mean turning it off; and if a request to control is made when it is off, the control would mean turning it on. As for an electromagnetic cooker, a control request while it is powered means stopping it; and a control request while it is stopped means powering it. In such a simple device, once the device is identified, only a predetermined operation needs to be performed such as inversion between ON and OFF, and therefore it is believed that the menu displaying as in the above-described electroencephalogram interface is not necessary.

In the present embodiment, rather than an activation apparatus used for activating an electroencephalogram interface which detects a visual P3 component, an example of an activation apparatus which activates a simple device and stops the operation of the device will be illustrated. However, in terms of controlling a device by using electroencephalograms, it is still similar to Embodiments 1 to 3. Therefore, the entire system including such an activation apparatus will be referred to as a "electroencephalogram interface system" also in the present embodiment.

Figures 16, 17:
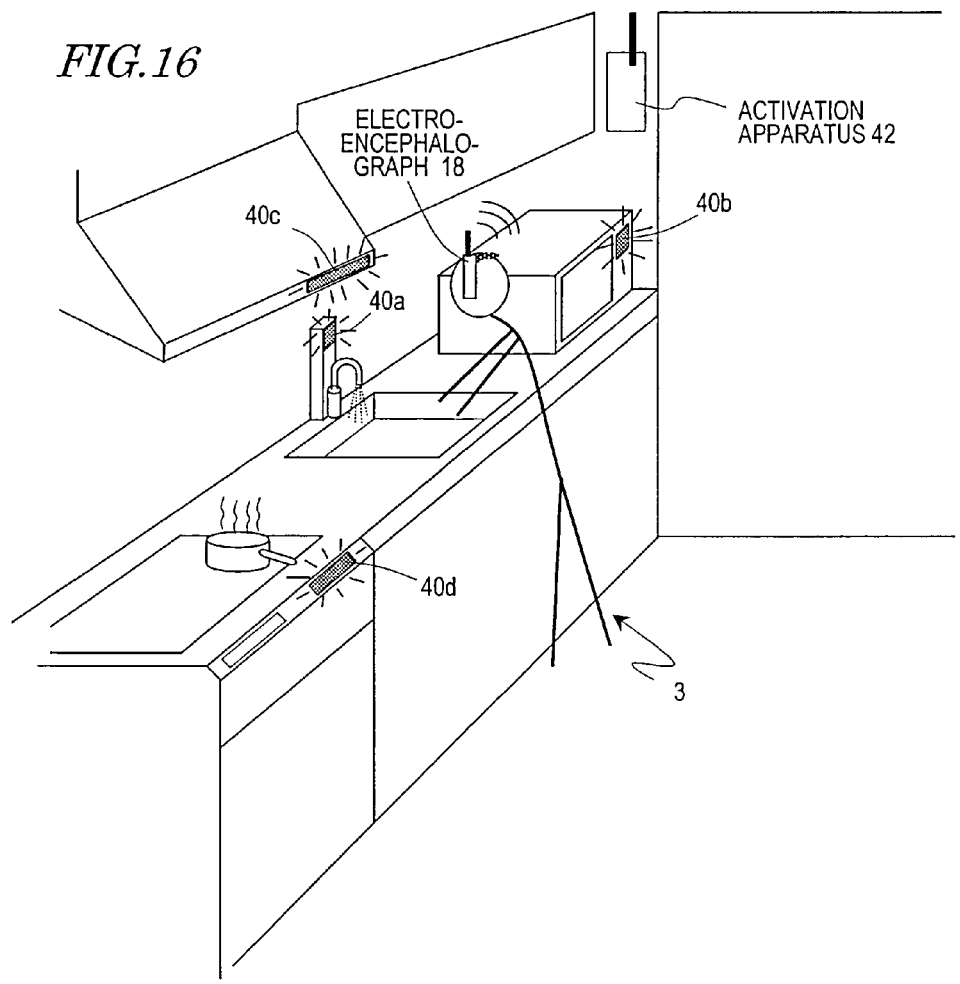
FIG. 16 A diagram showing an environment of use for an activation apparatus 42 according to Embodiment 4.
FIG. 17 A diagram showing correspondence between a device name 51 of each device shown in FIG. 16, a flicker frequency 52 of a flicker apparatus provided in each device, and a corresponding device operation 53.

FIG. 16 shows an environment of use for the electroencephalogram interface system including an activation apparatus 42 according to the present embodiment. The activation apparatus 42 is used in a situation where household chores are performed in a kitchen.

In a kitchen, many tasks exist which involve the use of both hands, e.g., washing and cooking, and during such tasks, the user 3 cannot perform any other tasks. On the other hand, the user 3 needs to simultaneously handle many devices and cooking utensils.

The inventors have paid attention to the fact that simple control is requested for many of the devices and cooking utensils that are handled, thus realizing activation of a device and stopping of its operation by using the activation apparatus 42. As a result, even during a task which occupies both hands of the user 3, it becomes possible to activate various kinds of devices and stop their operations.

The user 3 is wearing an electroencephalograph 18, and the activation apparatus 42 wirelessly detects an electroencephalogram signal from the user 3 which is detected by the electroencephalograph 18. The hardware construction of the activation apparatus 42 is identical to that of the example of the activation apparatus 2 shown in FIG. 2. Moreover, the functional construction of the activation apparatus 42 is identical to the construction of the activation apparatus 2 of FIG. 7, FIG. 10, or FIG. 13. The functions of the activation apparatus 42 are realized as a computer program which defines the below-described processing procedure is executed by a CPU 2a (FIG. 2).

On devices which are installed in the kitchen, flicker apparatuses 40a to 40d (LEDs, etc.), which cause light sources to flicker, are attached. In FIG. 16, the flicker apparatuses 40a to 40d are provided on, respectively, a water tap, a microwave oven, a range hood, and an electromagnetic cooker, and are flickering at respectively different frequencies. The flicker frequencies of the flicker apparatuses 40a to 40d are controlled by a frequency adjustment section (not shown) similar to that of the frequency adjustment section 9 (FIG. 7) of Embodiment 1 or the frequency adjustment section 17 (FIGS. 10 and 13) of Embodiments 2 and 3.

When the user 3 sees a flickering of a flicker apparatus which is associated with the device that he or she wishes to control, a visual evoked potential of a specific frequency is induced in the electroencephalograms of the user 3, and is detected by the electroencephalograph 18. The activation apparatus 42 calculates a frequency intensity of that electroencephalogram signal, determines which device has the frequency corresponding to the frequency exhibiting a local peak, and identifies the corresponding device. The identified device can be considered as the subject that the user 3 wishes to control the operation of. Therefore, the activation apparatus 42 controls the operation of that device with a predetermined method.

FIG. 17 shows correspondence between a device name 51 of each device shown in FIG. 16, a flicker frequency 52 of the flicker apparatus provided on each device, and a corresponding device operation 53. Based on the correspondence, peaks of the electroencephalogram signal are searched for, and a device operation is determined.

For example, the flicker apparatus 40a attached to the tap flickers with a frequency of 6 Hz. Assuming that the device which has been identified by the activation apparatus 42 based on the electroencephalogram signal from the user 3 is the tap, the activation apparatus 42 opens the tap if it is closed, or closes the tap if it is open.

Note that the microwave oven exemplified as Device 2 in FIG. 17 is multi-functional, and it requires use of an electroencephalogram interface for correctly conveying the requests of a user. Therefore, similarly to Embodiments 1 to 3, the activation apparatus 42 activates an electroencephalogram interface to cause a menu to be displayed on the display window of the microwave oven. In the case where the electroencephalograph 18 is constructed integral with a head-mount display, it will be possible to indicate a menu on the display that is worn.

FIG. 18 shows a processing procedure of the activation apparatus 42 according to the present embodiment. The following process will be described by utilizing the component elements activation apparatus 2 shown in FIG. 7 (the frequency analysis section 7, the activation determination section 8, and the frequency adjustment section 9). Note that, on each device to become a subject of control, a device control section is provided which controls that device upon receiving an instruction from the activation determination section 8 of the activation apparatus 42. This device control section corresponds to the device control section 5 in FIG. 7. In the present embodiment, however, the device control section of each device does not need to provide an electroencephalogram interface, but may merely have the function of controlling the activation of the device as well as ending of its operation.

At step S101, the electroencephalograph 18 detects electroencephalograms as a biological signal from the user 3. At step S102, the frequency analysis section 7 of the activation apparatus 42 analyzes the frequency of the electroencephalograms acquired at step S101, and calculates a signal intensity at each frequency.

At step S103, the activation determination section 8 determines, among the frequencies assigned to the respective devices, which device has a frequency containing the corresponding local peak. Note that the local peak is to be determined whether it is a frequency intensity exceeding a predetermined threshold (e.g. 4500 (μV·μV/Hz)).

If the frequencies assigned to no devices are included, the process is ended. If a peak is contained at the frequency of any one of the devices, the device corresponding to that frequency is identified, and a process of reading control data for that device is executed (steps S104a, S104b, . . . , S104n). Thereafter, based on the control data having been read, a process of controlling the device is performed (steps S105a, S105b, . . . , S105n).

For example, at step S104a, data for controlling Device 1 (tap) is read by the activation determination section 8. This data is data concerning the details of control for each device. For example, data similar to the device operation 53 in FIG. 17 is stored in the RAM 2b (FIG. 2). The activation determination section 8 acquires a current state of Device 1, and if the tap is open, sends an instruction to Device 1 to perform control for closing it, and if it is closed, sends an instruction to Device 1 to perform control for opening it. As a result, the device control section for the tap executes control as instructed, and opens or closes the tap by utilizing an electrical mechanism of the tap, for example.

As for the method of setting the predetermined frequencies in the Table of FIG. 17, the frequency assignment for each device may be changed in accordance with the importance level of the device. In the aforementioned instance of a kitchen, the importance level of a device can be determined based on the level of influence occurring when the control fails. Specifically, high importance levels may be set for devices which deal with fire or heat sources, and relatively low importance levels may be set for lights, ventilation, and the like. The reason is that, even if control fails for the latter, retries are permissible.

As has been described in connection with Embodiment 1, frequencies that are easy to detect and frequencies that are difficult to detect may vary due to changes in the currently-presented video content or a person's internal state. Therefore, in the case where a plurality of frequencies are to be set, the above-described priority handling is necessary.

Even after the frequencies shown in the Table of FIG. 17 have been set, the frequencies which are difficult to detect may fluctuate due to the physical condition of the user 3 and the like. Therefore, by using the frequency analysis section 7 and the activation determination section 8 to detect such fluctuations, and using the frequency adjustment section 9 to change the frequency to that which is easy to detect, the accuracy of detection can be enhanced. Moreover, an arrangement may be adopted such that, even when the table of correspondence between frequencies and devices is updated, the table will be correctly referred to during the device determination (step number); as a result, complicated frequency changes will become possible.

As described above, in situations where the hands of the user 3 are full, selection of a device is realized based on a steady-state visual evoked potential of electroencephalograms, whereby the device can be controlled without using hands.

In the present embodiment, an electroencephalogram signal from the user 3 is sent from the electroencephalograph 18 to the activation apparatus 42, and the activation apparatus 42 performs control over each device. However, the aforementioned function of the activation apparatus 42 may be conferred to the electroencephalograph 18, and each device may be directly controlled with a signal which is output from the electroencephalograph 18. In this case, the signal which is output from the electroencephalograph 18 serves as a control signal for each device which is output from the aforementioned activation determination section. Each device will have a reception section for wirelessly receiving the control signal.

Industrial Applicability

With the electroencephalogram interface system according to the present invention, at every phase such as activation of an electroencephalogram interface, selection and confirmation of a menu after activation of the electroencephalogram interface, and so on, manipulations via the electroencephalogram interface are possible by utilizing the electroencephalograms of a user. This system is broadly applicable in scenes where device control is required. By applying this system to an information device, for example, even in situations where the hands are full, e.g., while driving a car or holding a baby, it is possible to control that information device based only on electroencephalograms. As a result, advantages of the electroencephalogram interface system can be fully utilized.

The invention claimed is:

1. An electroencephalogram interface system comprising: a biological signal detection section for detecting an electroencephalogram signal from a user, and a control section for distinguishing a component of an event-related potential which is contained in the electroencephalogram signal and causing a device to operate based on the distinguished event-related potential, wherein,
the electroencephalogram interface system further comprises:
an activation apparatus for activating the control section from an inactive state in which the control section is not processing electroencephalogram signals, and
an output section for presenting a visual stimulation which flickers with a predetermined frequency based on a signal from the activation apparatus; and
the activation apparatus includes:
a frequency analysis section for analyzing a frequency component of the electroencephalogram signal detected by the biological signal detection section, and detecting an intensity corresponding to the predetermined frequency;
a determination section for comparing the detected intensity of the predetermined frequency and a predetermined threshold, and if the intensity of the predetermined frequency is equal to or greater than the predetermined threshold, determining that the user has been paying attention to the visual stimulation and thus activating the control section;
a biological signal analysis section for analyzing signal intensities of a plurality of frequencies contained in the electroencephalogram signal detected by the biological signal detection section;
a setting section for setting the predetermined frequency based on a result of analysis by the biological signal analysis section; and
an adjustment section for generating a signal for presenting the visual stimulation at the frequency having been set,
wherein the biological signal analysis section continuously analyzes the signal intensities of the plurality of frequencies, and sets as the predetermined frequency a frequency which is different from a frequency whose signal intensity is increasing.

2. In an electroencephalogram interface system having a biological signal detection section for detecting an electroencephalogram signal from a user and a control section for distinguishing a component of an event-related potential which is contained in the electroencephalogram signal and causing a device to operate based on the distinguished event-related potential, an activation apparatus to be used for activating the control section from an inactive state in which the control section is not processing electroencephalogram signals, wherein,
the electroencephalogram interface system further has an output section for presenting a visual stimulation which flickers with a predetermined frequency based on a signal from the activation apparatus, the activation apparatus comprising:
a frequency analysis section for analyzing a frequency component of the electroencephalogram signal detected by the biological signal detection section, and detecting an intensity corresponding to the predetermined frequency;
a determination section for determining whether the user has been paying attention to the visual stimulation or not based on the detected intensity of the predetermined frequency, and activating the control section based on a result of determination;
a biological signal analysis section for analyzing signal intensities of a plurality of frequencies contained in the electroencephalogram signal detected by the biological signal detection section;
a setting section for setting the predetermined frequency based on a result of analysis by the biological signal analysis section; and
an adjustment section for generating a signal for presenting the visual stimulation at the frequency having been set,
wherein the biological signal analysis section continuously analyzes the signal intensities of the plurality of frequencies, and sets as the predetermined frequency a frequency which is different from a frequency whose signal intensity is increasing.

3. The activation apparatus of claim 2, wherein the determination section determines whether the user has been paying attention to the visual stimulation or not based on a result of comparison between the intensity of the predetermined frequency and a predetermined threshold.

4. The activation apparatus of claim 3, wherein, when the intensity of the predetermined frequency is equal to or greater than the predetermined threshold, the determination section determines that the user has been paying attention to the visual stimulation and activates the control section.

5. The activation apparatus of claim 2, wherein, the output section outputs a video content as a result of operation of the device; and
the activation apparatus further comprises:
a content analysis section for analyzing signal intensities of a plurality of frequencies contained in the vide content;

a setting section for setting the predetermined frequency based on a result of analysis by the content analysis section; and an adjustment section for generating a signal for presenting the visual stimulation at the frequency having been set.

6. The activation apparatus of claim 2, wherein, the output section has a screen for presenting a video content which is output as a result of operation of the device; and the activation apparatus further comprises:

a content analysis section for analyzing signal intensities of a plurality of frequencies contained in the vide content;

a biological signal analysis section for analyzing signal intensities of a plurality of frequencies contained in the electroencephalogram signal detected by the biological signal detection section;

a setting section A for, among the analyzed signal intensities of the respective frequencies, notifying a frequency having a signal intensity which is higher than a predetermined threshold;

a setting section B for, based on a result of analysis by the content analysis section, notifying a frequency at which the video content changes; and an adjustment section for setting as the predetermined frequency a frequency which is different from the frequency notified by the setting section A and from the frequency notified by the setting section B.

7. The activation apparatus of claim 5, wherein, the output section has a screen for presenting a video content which is output as a result of operation of the device; and the adjustment section presents the visual stimulation by flickering a portion of the screen at the predetermined frequency.

8. The activation apparatus of claim 5, wherein, the output section includes a light source for presenting the visual stimulation and a screen for presenting a video content which is output as a result of operation of the device; and the adjustment section presents the visual stimulation by flickering the light source at the predetermined frequency.

9. The activation apparatus of claim 5, wherein the determination section activates the control section, and causes the control section to allow the device to operate based on the distinguished event-related potential and causes the adjustment section to stop presenting the visual stimulation.

10. An electroencephalogram interface system for detecting an electroencephalogram signal from a user and controlling an operation of at least one device based on the electroencephalogram signal, comprising:

a biological signal detection section for detecting an electroencephalogram signal from a user;

an output section being provided corresponding to the at least one device and having a light source for presenting a visual stimulation; and an activation apparatus for controlling activation of the at least one device from an inactive state in which electroencephalogram signals are not being processed, and stopping of an operation thereof, wherein the activation apparatus includes:

a frequency analysis section for analyzing a frequency component of the electroencephalogram signal detected by the biological signal detection section, and detecting an intensity corresponding to the predetermined frequency;

a determination section for determining whether the user has been paying attention to the visual stimulation or not based on the detected intensity of the predetermined frequency, and activating the at least one device or stopping an operation thereof based on a result of determination;

a biological signal analysis section for analyzing signal intensities of a plurality of frequencies contained in the electroencephalogram signal detected by the biological signal detection section;

a setting section for setting the predetermined frequency based on a result of analysis by the biological signal analysis section; and an adjustment section for generating a signal for presenting the visual stimulation at the frequency having been set, wherein the biological signal analysis section continuously analyzes the signal intensities of the plurality of frequencies, and sets as the predetermined frequency a frequency which is different from a frequency whose signal intensity is increasing.

11. A method to be used in an electroencephalogram interface system for controlling a device based on an electroencephalogram signal from a user, comprising the steps of:

presenting a visual stimulation flickering with a predetermined frequency;

detecting an electroencephalogram signal from a user;

analyzing a frequency component of the detected electroencephalogram signal, and detecting an intensity corresponding to the predetermined frequency;

comparing the detected intensity of the predetermined frequency and a predetermined threshold;

activating the device from an inactive state in which electroencephalogram signals are not being processed if the intensity of the predetermined frequency is equal to or greater than a predetermined threshold;

analyzing signal intensities of a plurality of frequencies contained in the electroencephalogram signal detected by the biological signal detection section;

setting the predetermined frequency based on a result of analysis by the biological signal analysis section; and generating a signal for presenting the visual stimulation at the frequency having been set, wherein the analyzing step continuously analyzes signal intensities of the plurality of frequencies, and sets as the predetermined frequency a frequency which is different from a frequency whose signal intensity is increasing.

12. In an electroencephalogram interface system having a biological signal detection section for detecting an electroencephalogram signal from a user and a control section for distinguishing a component of an event-related potential which is contained in the electroencephalogram signal and causing a device to operate based on the distinguished event-related potential, a computer program embodied in a computer-readable medium and to be executed in an activation apparatus used for activating the control section from an inactive state in which the control section is not processing electroencephalogram signals, wherein, the electroencephalogram interface system further includes an output section for presenting a visual stimulation which flickers with a predetermined frequency based on a signal from the activation apparatus, the computer program comprising the steps of:

analyzing a frequency component of the electroencephalogram signal detected by the biological signal detection section, and detecting an intensity corresponding to the predetermined frequency;

determining whether the user has been paying attention to the visual stimulation or not based on the detected intensity of the predetermined frequency, and activating the control section based on a result of determination;

analyzing signal intensities of a plurality of frequencies contained in the electroencephalogram signal detected by the biological signal detection section;

setting the predetermined frequency based on a result of analysis by the biological signal analysis section; and generating a signal for presenting the visual stimulation at the frequency having been set, wherein the analyzing step continuously analyzes signal intensities of the plurality of frequencies, and sets as the predetermined frequency a frequency which is different from a frequency whose signal intensity is increasing.

* * * * *

UNITED STATES PATENT AND TRADEMARK OFFICE
CERTIFICATE OF CORRECTION

| | | |
|---|---|---|
| PATENT NO. | : 8,185,193 B2 | |
| APPLICATION NO. | : 12/374879 | |
| DATED | : May 22, 2012 | |
| INVENTOR(S) | : Koji Morikawa et al. | |

It is certified that error appears in the above-identified patent and that said Letters Patent is hereby corrected as shown below:

Column 24, line 37, "result of determination" should read -- result of the determination --.

Column 24, line 67, "vide" should read -- video --.

Column 25, line 12, "vide" should read -- video --.

Signed and Sealed this
Ninth Day of October, 2012

David J. Kappos
*Director of the United States Patent and Trademark Office*